United States Patent
Takeda et al.

(10) Patent No.: US 7,283,262 B2
(45) Date of Patent: Oct. 16, 2007

(54) IMAGE FORMING APPARATUS AND POWER CONTROL METHOD

(75) Inventors: Tomoyuki Takeda, Ibaraki (JP); Kazuki Miyamoto, Chiba (JP); Shigeo Miura, Tokyo (JP); Takeharu Uchizono, Ibaraki (JP); Takahiro Ushiro, Ibaraki (JP); Shinichi Takata, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1042 days.

(21) Appl. No.: 10/609,371

(22) Filed: Jul. 1, 2003

(65) Prior Publication Data

US 2004/0004732 A1    Jan. 8, 2004

(30) Foreign Application Priority Data

Jul. 3, 2002  (JP) .............................. 2002-194232

(51) Int. Cl.
   *B41F 33/00*  (2006.01)
(52) U.S. Cl. .................. 358/1.14; 358/1.13; 358/1.14; 358/1.15; 358/440; 399/8; 399/9; 399/37
(58) Field of Classification Search ............... 358/1.13, 358/1.14, 1.15, 440; 399/8, 9, 37
See application file for complete search history.

(56) References Cited

U.S. PATENT DOCUMENTS

| | | | | |
|---|---|---|---|---|
| 5,848,318 | A | * | 12/1998 | Okimoto ...................... 399/8 |
| 6,122,750 | A | * | 9/2000 | Hayasaka .................. 713/340 |
| 6,807,907 | B2 | * | 10/2004 | Yamada ..................... 101/484 |
| 6,879,410 | B1 | * | 4/2005 | Tokura ...................... 358/1.14 |
| 2002/0147005 | A1 | * | 10/2002 | Tezuka et al. .............. 455/418 |

FOREIGN PATENT DOCUMENTS

| | | |
|---|---|---|
| JP | 57-168573 | 10/1982 |
| JP | 2000-232540 | 8/2000 |
| JP | 2001-175440 | 6/2001 |
| JP | 2002-175168 | 6/2002 |

\* cited by examiner

*Primary Examiner*—Aung S. Moe
*Assistant Examiner*—Peter K Huntsinger
(74) *Attorney, Agent, or Firm*—Fitzpatrick, Cella, Harper & Scinto

(57) ABSTRACT

A sub-CPU copes with a status obtaining request from a network in a sleep mode. Further, necessary least power control for updating a status in an image forming apparatus in the sleep mode is realized by the sub-CPU.

9 Claims, 18 Drawing Sheets

| FIG. 3A |
| FIG. 3B |

TO FIG. 3B

| FIG. 8A |
| FIG. 8B |

TO FIG. 8B

MEMORY MAP IN MEMORY MEDIUM

IMAGE FORMING APPARATUS AND POWER CONTROL METHOD

BACKGROUND OF THE INVENTION

1. Field of the Invention

The invention relates to an image forming apparatus which is connected to a network via network connecting means and can execute a predetermined job process and to a power control method.

2. Related Background Art

Hitherto, a system constructed by connecting printers (including a copying apparatus and a hybrid apparatus) and computers via a network exists.

FIG. 16 is a block diagram showing an example of a conventional network system including an image forming apparatus and corresponds to, for example, a construction of a network system which is used by a plurality of users in a network environment.

In FIG. 16, the network system is constructed by connecting a plurality of PCs (personal computers) 103a and 103b, a plurality of copying apparatuses 101a and 101b, and a server 102 via a network. The copying apparatus (each of the copying apparatuses 101a and 101b) is constructed by a printer unit 231, a reader unit 226, a controller unit 232, and a DC power source 203. The controller unit 232 transmits and receives signals to/from the outside, makes on/off control of the DC power source 203, and controls the reader unit 226 and the printer unit 231 via the network.

Ordinarily, when the copying operation and the printing operation are not executed for a predetermined time, the copying apparatus enters a sleep mode (power saving mode) in order to save energy.

Application software to manage the network has been known. By installing such software into the PC, a status of the copying apparatus connected to the network can be recognized. For example, if absence of sheets occurs, such a status of the copying apparatus can be displayed on a display screen of the PC. Even if the copying apparatuses 101a and 101b are in the sleep mode, when there is a print request from the PC connected to the network, it is detected, the DC power source 203 of the copying apparatus is activated, and the whole copying apparatus is activated, thereby performing a print output.

The foregoing conventional technique, however, has the following problems.

If an inquiry about the latest status of the image forming apparatus, for example, the copying apparatus connected to the network which is always updated is made by the PC when the copying apparatus is in the sleep mode, the controller unit 232 in the copying apparatus activates the DC power source 203, supplies a power source to all devices including various sensors in an engine, and detects the inquired status. To detect the status, the controller unit 232 communicates with the reader unit 226 and printer unit 231 and returns communication results to the network.

Therefore, in spite of the fact that the apparatus is in a state of the sleep mode in which the energy saving is accomplished, each time the status of the copying apparatus is inquired, it is necessary to supply the power source to the whole copying apparatus, or the power source of the copying apparatus always has to be kept in a current supplying mode. Such a situation is contradictory to a recent energy saving purpose.

A method whereby a current is supplied only to the sensors in the engine in the printer in the power saving mode only in the case where there is a status request from the application software for managing the network can be considered. However, it is presumed that under conditions such that a plurality of users share the printer, the status requests are frequently made by the plurality of users, so that a power saving effect cannot be expected.

SUMMARY OF THE INVENTION

The invention is made to solve the above problems and it is an object of the invention to provide a mechanism which can realize power saving more effective than the conventional one and can make a response of an updated status to a status request from an external apparatus without making the user be aware or execute any tiresome operations.

It is another object of the invention to provide a mechanism in an image forming apparatus having a plurality of various types of sensors, wherein a status response to an external apparatus can be made to a sub-CPU whose electric power consumption is smaller than that of a main chip.

To accomplish the above objects, there is provided a mechanism in an image forming apparatus which can communicate with an external apparatus via network connecting means, wherein when an internal status of the image forming apparatus is updated, control is made so as to periodically activate a power supply of a power source which is necessary for the status update and power-saved in a power saving mode and the external apparatus is notified of the status updated in accordance with such control.

Or, there is provided a mechanism constructed in a manner such that the power source to detecting means is intermittently supplied to thereby allow the detecting means to update the status, when an inquiry about the status of the image forming apparatus is made by the network connecting means when a power control mode is in a normal standby mode, the notification of status information detected before by the detecting means is made by first control means, when the inquiry about the status of the image forming apparatus is made by the network connecting means when the power control mode is in the power saving mode, the notification based on the status information updated by update control means is made by second control means, and a power supplying state to the first and second control means is controlled in accordance with whether the power control mode is in the normal standby mode or the power saving mode.

DETAILED DESCRIPTION OF THE PREFERRED EMBODIMENTS

First Embodiment

Figure 1:
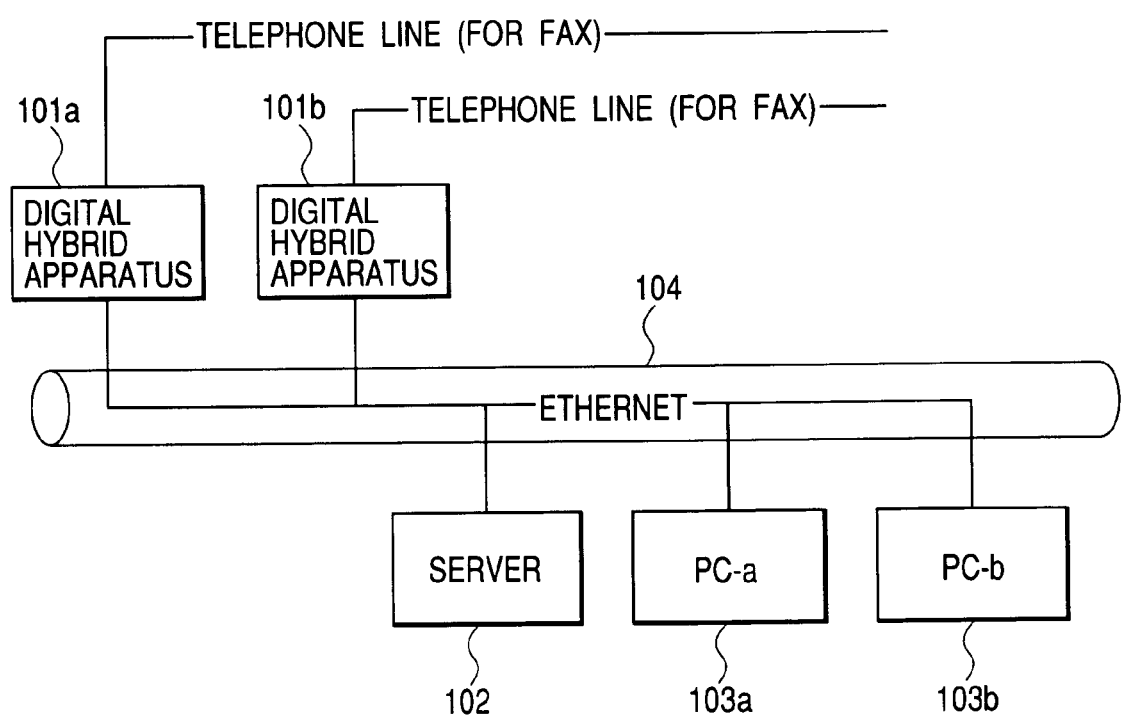
FIG. 1 is a block diagram showing an example of a network system to which an image forming apparatus showing the first embodiment of the invention can be applied.

FIG. 1 is a block diagram showing an example of a network system to which an image forming apparatus showing the first embodiment of the invention can be applied. Naturally, image forming apparatuses to which the invention can be applied include: a printing apparatus (printer) and a facsimile apparatus using an electrophotographic system or an ink jet system or a digital hybrid apparatus for executing compound image processes including a printing process and a facsimile process. The digital hybrid apparatus will be described as an example hereinbelow.

In FIG. 1, reference numerals 101a and 101b denote the digital hybrid apparatuses. As will be explained hereinlater, an electric power is supplied from the power source 203 to the printer unit 231, reader unit 226, and controller unit 232, so that those digital hybrid apparatuses operate.

Reference numeral 102 denotes the server and 103a and 103b indicate the PCs (personal computers) and those apparatuses are connected by Ethernet (registered trademark) 104 as a local area network. It is possible that the user connects to the PCs 103a and 103b or the server 102 shown in FIG. 1, receives print jobs from the PCs 103a and 103b, and outputs status information in response to inquiries about statuses which are made by the PCs 103a and 103b via the Ethernet (registered trademark) 104, respectively.

The "status" used here indicates an accumulating situation or a processing situation of current jobs, size setting of a present sheet cassette, the presence or absence of paper in the sheet cassette, a connecting situation of an option, or the presence or absence of toner. The digital hybrid apparatus has a facsimile function and is connected to the outside via a predetermined communication line (for example, telephone line) so that it can communicate.

In the digital hybrid apparatus, the same constructing portions as those of a general copying apparatus will be simply explained hereinbelow. With respect to the operation to read out an image from an original, image data is converted into digital data by using a photoelectric converting device such as CCD or contact sensor. With respect to the printing operation, a latent image is formed onto a photosensitive material charged at a high voltage by using a laser, an image of toner as a developing material is formed onto the latent image, and it is transferred onto transfer paper.

The digital hybrid apparatus in the embodiment has two waiting modes: a standby mode and a sleep mode. In these modes, neither of the copying operation, the printing operation, the facsimile transmitting operation, the facsimile receiving operation, the scanning operation, and their compound operation is executed.

In the standby mode, although the above operation is not executed now, it can be immediately started. In the sleep mode, although the above operation is not executed now and cannot be immediately started, electric power consumption is smaller than that in the standby mode.

Figure 2:
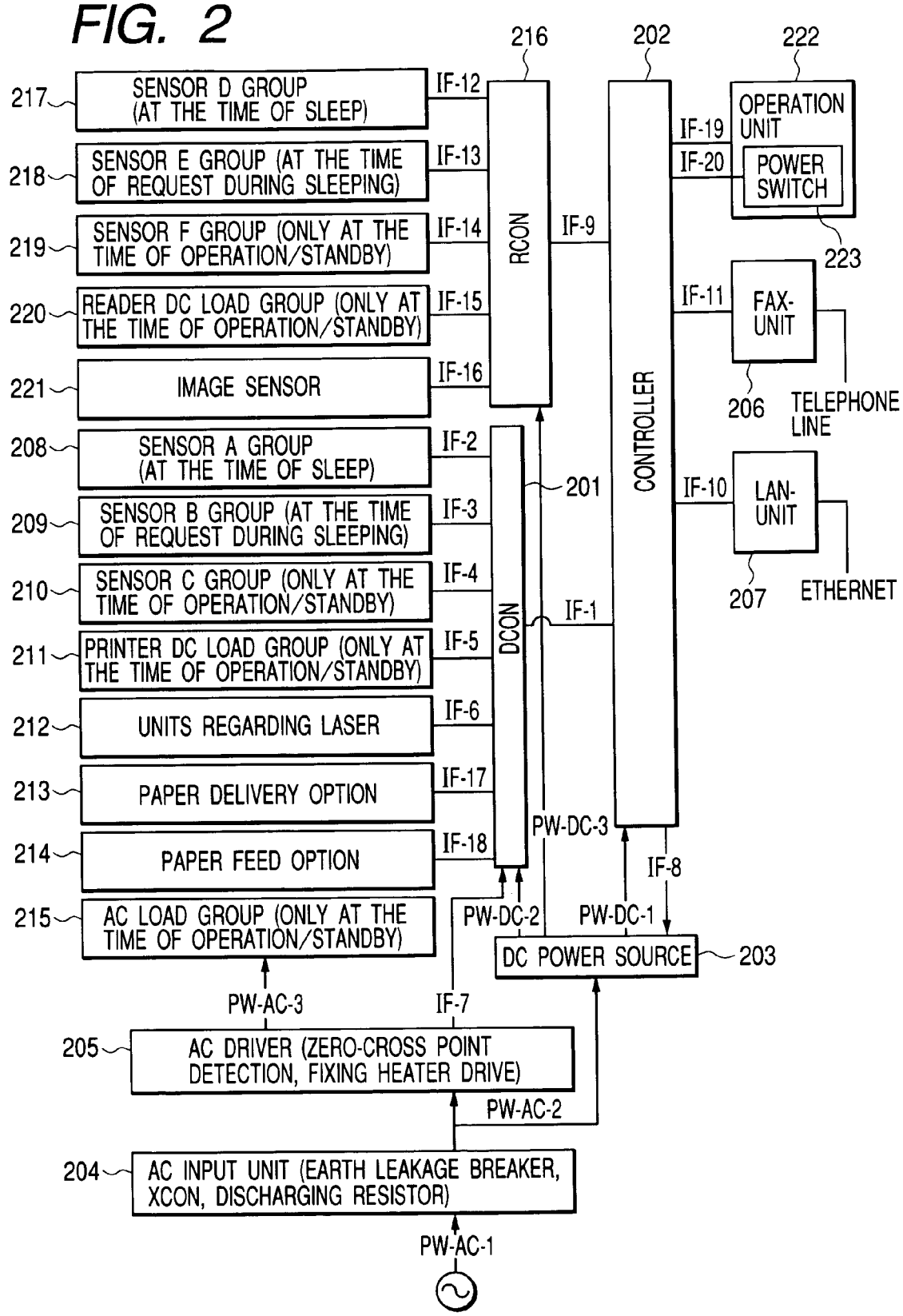
FIG. 2 is a block diagram for explaining a control construction of a digital hybrid apparatus shown in FIG. 1.

FIG. 2 is a block diagram for explaining a control construction of each of the digital hybrid apparatuses 101a and 101b shown in FIG. 1.

In FIG. 2, reference numeral 201 denotes a control board (DCON). The DCON 201 receives video data from a controller (main control board) 202, which will be explained hereinlater, via an interface I/F-1, makes print control, is connected to sensor groups 208, 209, and 210 necessary for various print control via interfaces I/F-2, I/F-3, and I/F-4, is connected via an interface I/F-5 to a DC load group 211 for printing, is connected via an interface I/F-6 to units 212 regarding a laser for exposing the photosensitive material, and controls those component devices, respectively.

The DCON 201 is connected via an interface I/F-7 to a paper delivery option 213 for sorting, is connected via an interface I/F-18 to a paper feed option 214 for increasing the number of sheet cassettes for paper feed, and controls various information by serial communication, respectively.

The sensors are classified into three groups: the sensor A group 208 for periodically detecting in the sleeping state as well as in a state during the copying/printing operation or in a standby mode; the sensor B group 209 for detecting in more detail in the sleep mode as well as in the state during the copying/printing operation and in the standby mode in accordance with statuses of the sensor A group if it is determined that the detection is necessary; and the sensor C group 210 for detecting only in the state during the copying/printing operation and in the standby mode but never performing the detection in the sleep mode.

The DCON 201 is connected via the interface I/F-7 to an AC driver 205, which will be explained hereinlater, and controls an AC load group 215 connected after the AC driver 205. A heater (not shown) for heating and fusing the toner and fixing it onto the sheet is included in the AC load group 215. With respect to the power supply to the DCON 201, the power source which is supplied only in an operative mode and the standby mode is supplied from the DC power source 203 via PW-DC-2, and the power source which is supplied also in the sleep mode is supplied from the controller 202 via the interface I/F-1.

The AC driver 205 applies an AC voltage of 100V to the AC load group 215. In this case, the current supply and non-current supply of AC 100V to the AC load group 215 are switched by a switching device such as triac or SSR via PW-AC-3 in response to an on/off signal which is supplied from the DCON 201 via the interface I/F-7.

Reference numeral 216 denotes a control board (RCON) which controls a scanner system, is connected via interfaces I/F-12, I/F-13, and I/F-14 to an image sensor for reading the image and sensor groups 217, 218, and 219 for controlling the original paper, is connected via interface I/F-15 to a DC load group 220, and controls those devices, respectively.

The sensors connected to the RCON 216 are also classified into three groups: the sensor D group 217 for periodically detecting in the sleeping state as well as in a state during the copying/printing operation or in a standby mode; the sensor E group 218 for detecting in more detail in the sleep mode as well as in the state during the copying/printing operation and in the standby mode after the sensor D group changes; and the sensor F group 219 for detecting only in the state during the copying/printing operation and in the standby mode but never performing the detection in the sleep mode.

Reference numeral 221 denotes an image sensor for converting the image into an electric signal. The image sensor 221 converts a format of the electric signal into a predetermined format and transfers the video data to the controller 202, which will be explained hereinlater, via interfaces I/F-16 and I/F-9.

Reference numeral 202 denotes the main control board (controller) which is connected to the DCON 201 via the interface I/F-1 and is connected to the RCON 216 via the interface I/F-9. By this connection, in the copy mode, the video data of the original is sent from the RCON 216 to the controller 202. After the video data is processed, it is sent from the controller 202 to the DCON 201. At this time, in the controller 202, processes for converting a format of the video data, modifying the video data, and matching transfer timing of video data with timing of the printer are executed. The controller 202 is connected to an operation unit 222 via an interface I/F-19 and can receive an input from the operator and display a necessary message to him. Reference numeral 223 denotes a power switch. An input signal from an interface I/F-20 becomes a trigger for shift to the sleep mode or recovery from the sleep mode to the standby mode.

The controller 202 is also connected to the DC power source 203 via the interface I/F-8 and can control the turn-on/off of a partial DC power output included in PW-DC-1, PW-DC-2, and PW-DC-3. The controller 202 is connected to a FAX-UNIT 206 via an interface I/F-11 and connected to a telephone line after the FAX-UNIT 206. The controller 202 is connected to a LAN-UNIT 207 via an interface I/F-10 and connected to the Ethernet (registered trademark) after the LAN-UNIT 207. The LAN-UNIT 207 is not limited to the Ethernet (registered trademark) but presumed to be a communication unit according to a predetermined protocol. Naturally, both of a wireless manner and a wired manner can be applied.

Reference numeral 204 denotes an AC input unit. An AC voltage of 100V is inputted from a power outlet to the AC input unit 204 via a path of PW-AC-1 and the AC input unit 204 supplies the AC voltage of 100V to the DC power source 203 and AC driver 205 via a path of PW-AC-2 through a circuit for detecting an electric leakage, an XCON for removing noises, or a circuit such as a discharging resistor or the like of the XCON. The image sensor 221 is a sensor for reading the image.

Figures 3, 3A:
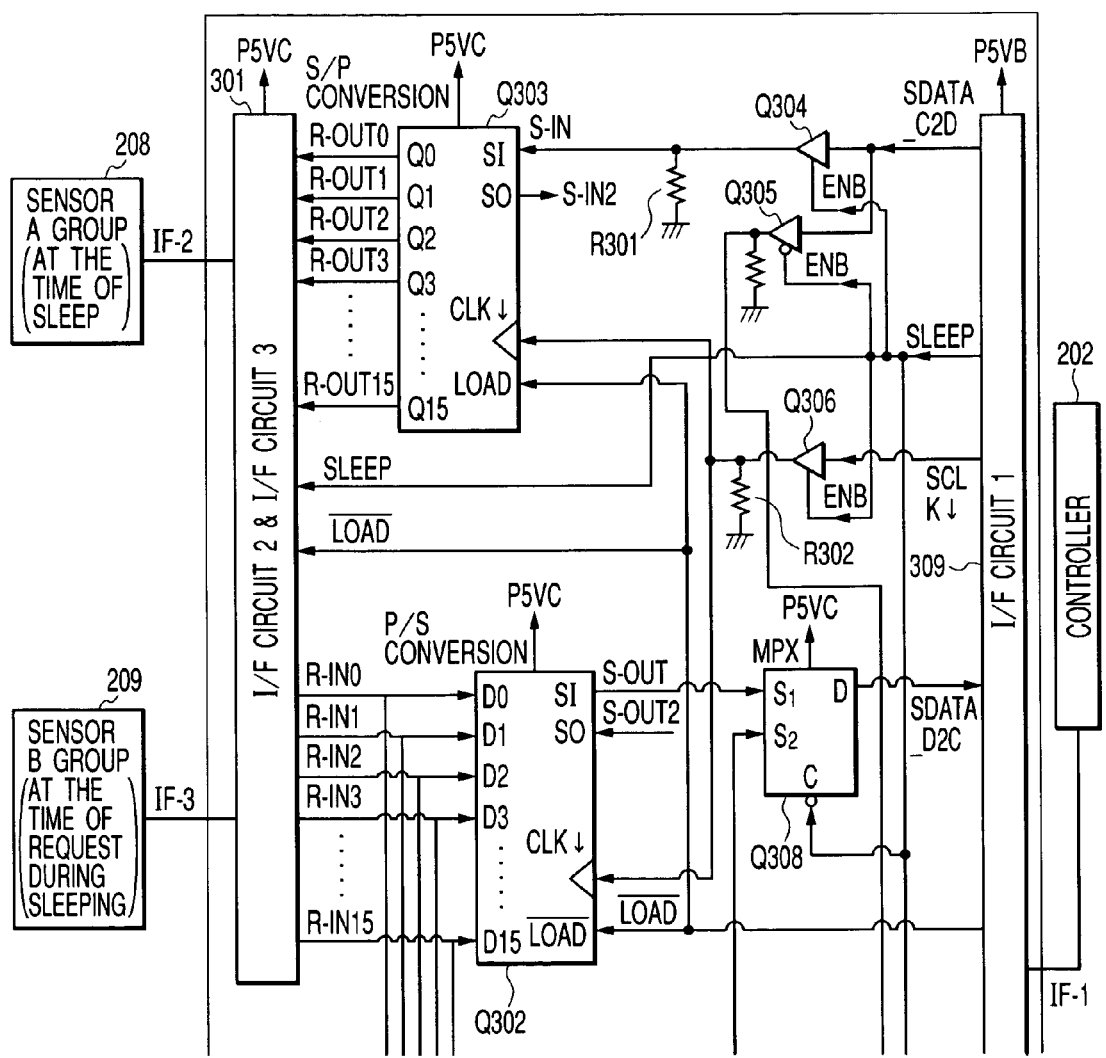
FIG. 3 which comprised of FIGS. 3A and 3B is a block diagram for explaining a construction of a DCON shown in FIG. 2.
Figure 3B:
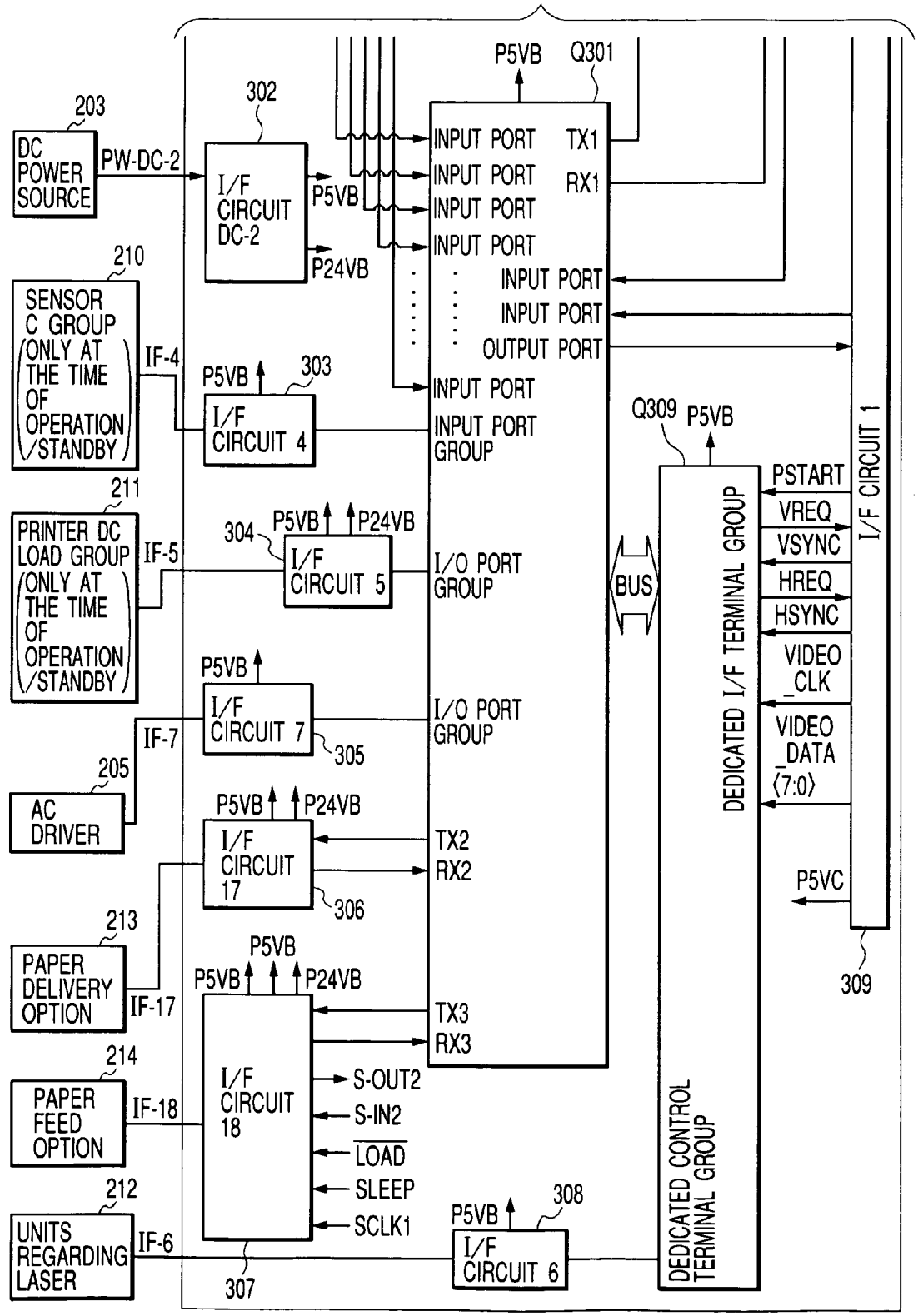

FIGS. 3A and 3B are block diagrams for explaining a construction of the DCON 201 shown in FIG. 2. In FIGS. 3A and 3B, the same and similar component elements as those in FIG. 2 are designated by the same reference numerals.

In FIGS. 3A and 3B, each of P5VB and P5VC denotes a power source of 5V. P5VB denotes the power source which is supplied from the DC power source 203 in the state during the copying/printing operation and in the standby mode. Reference numerals 301 to 309 denote interface circuits (I/F circuits).

The controller 202 controls the DC power source 203 so as to turn on or off P5VB. P5VC denotes the power source which is supplied from the controller 202 via the interface I/F-1. P5VC is always held in the ON state in the state during the copying/printing operation and in the standby mode. In the sleep mode, P5VC is turned on only when it is necessary.

The timing when it is necessary in the sleep mode is timing when the controller uses a parallel/serial (P/S) conversion unit Q302 and a serial/parallel (S/P) conversion unit Q303 and detects the sensor A group 208 and the sensor B group 209. P5VC is on/off controlled by the controller 202.

Q301 denotes a microcomputer which has at least a ROM and a RAM therein and operates in accordance with programs written in the ROM. One of roles of the microcomputer Q301 is monitoring of the status. The microcomputer Q301 detects the sensor A group 208 and the sensor B group 209, which will be explained hereinlater, at input ports and notifies the controller 202 (to a main CPU or a sub-CPU) of information indicative of the opening/closure of a door, an opening/closure state of the cassette, a sheet size, and the presence or absence of the sheets as parts of statuses by the serial communication of the interface I/F-1.

Another main role of the microcomputer Q301 is the control of the print. The microcomputer Q301 detects statuses of input ports connected to the sensor A group 208, sensor B group 209, and sensor C group 210, on/off controls the DC load group 211 and the AC driver 205 at output ports connected to the DC load group 211 and output ports connected to the AC driver 205, and makes conveyance control of the sheet, high-voltage control, fixing heater control, and the like.

Q309 denotes a gate array which receives the video data from the interface I/F-1, controls the units 212 regarding the laser via the I/F circuit 308 and the interface I/F-3, exposes the photosensitive material (not shown) by the laser on the basis of the video data, and forms a latent image as a distribution of a charging state onto the photosensitive material. The microcomputer Q301 writes set values for making the gate array Q309 operative via a bus.

As signals of the serial communication from the interface I/F-1, there are: SDATA_C2D as a serial data signal which is sent from the controller 202 to the DCON 201; SDATA_D2C as a serial data signal which is sent from the DCON 201 to the controller 202; and an SCLK↓ signal as a transfer clock of serial data. Among them, the serial data signals SDATA_C2D and SDATA_D2C are connected to serial communication terminals of the microcomputer Q301 and communicated with a main chip Q701 of the controller, which will be explained hereinlater, by signal switching circuits Q304, Q305, Q306, and Q308 for switching the connecting destination depending on the status of the SLEEP signal, when the SLEEP signal is at the low level in a mode other than the sleep mode.

As contents of the communication in a mode other than the sleep mode, various information such as command, status, and the like can be transmitted and received. No transfer clock is connected to the microcomputer Q301 but asynchronous communication which does not need any transfer clock is made with the controller 202.

Subsequently, in the sleep mode, the SLEEP signal in FIG. 2 is at the high level and the serial data signals SDATA_D2C and SDATA_C2D and the SCLK↓ signal are connected to the S/P conversion unit Q303 and the P/S conversion unit Q302 by the signal switching circuits Q304, Q305, Q306, and Q308. It will be obviously understood from a viewpoint of the construction that, as communication contents in the sleep mode, a more variety of information than that in the mode other than the sleep mode cannot be transmitted and received. As mentioned above, the notification destination of the information such as status or the like can be changed in accordance with the sleep mode (power saving mode) or the mode other than the sleep mode.

A LOAD signal is connected to the S/P conversion unit Q303. In the loading mode, the S/P conversion unit Q303 loads data of an internal serial register into a buffer in the S/P conversion unit Q303 directly connected to an output terminal Q0–Q15. In the mode other than the loading mode, the S/P conversion unit Q303 holds the data in the buffer.

The data in the serial register in the S/P conversion unit Q303 is outputted from an SO terminal of the S/P conversion unit Q303 synchronously with the SCLK↓ signal in an LSB-first manner. Data at an SI terminal of the S/P conversion unit Q303 is stored into the MSB of a shift register of the S/P conversion unit Q303 synchronously with a clock. The SDATA_D2C signal which is transmitted to the controller is connected to the SO terminal of the S/P conversion unit Q303 in the sleep mode. The SI terminal of the S/P conversion unit Q303 is cascade-connected to the paper feed option 214 in the sleep mode.

On the contrary, the LOAD signal is connected to the P/S conversion unit Q302. In the loading mode, the P/S conversion unit Q302 loads data at an input terminal D0–D15 into a serial register in the P/S conversion unit Q302. The data in the serial register in the P/S conversion unit Q302 is outputted from an SO terminal of the P/S conversion unit Q302 synchronously with the SCLK↓ signal in an LSB-first manner. Data at an SI terminal of the P/S conversion unit Q302 is stored into the MSB of a shift register of the P/S conversion unit Q302 synchronously with a clock. The SDATA_C2D signal which is received from the controller is connected to the SI terminal of the P/S conversion unit Q302 in the sleep mode. The SO terminal of the P/S conversion unit Q302 is cascade-connected to the paper feed option 214 in the sleep mode.

Figure 7:
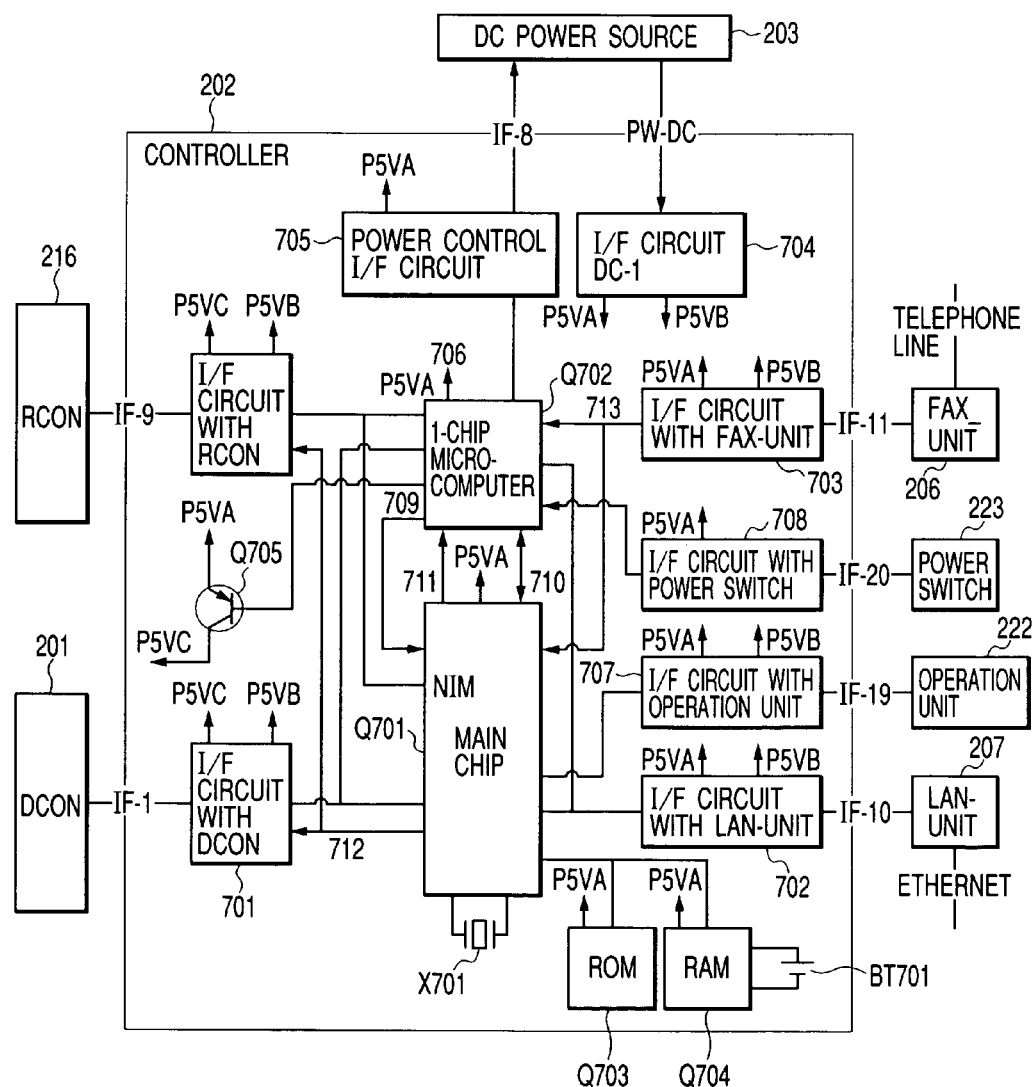
FIG. 7 is a diagram for explaining a detailed construction of the controller shown in FIG. 2.

As mentioned above, according to the construction of FIGS. 3A and 3B, in accordance with an instruction of the high level of the SLEEP signal from the main chip Q701 in FIG. 7, an electric power which is supplied to the microcomputer Q301 is saved. Since the signal switching circuits Q304, Q305, Q306, and Q308 are driven in place of the microcomputer Q301, a situation such that the communication of information such as a status or the like with the controller 202 is continuously made while saving an electric power is realized.

Figure 4:
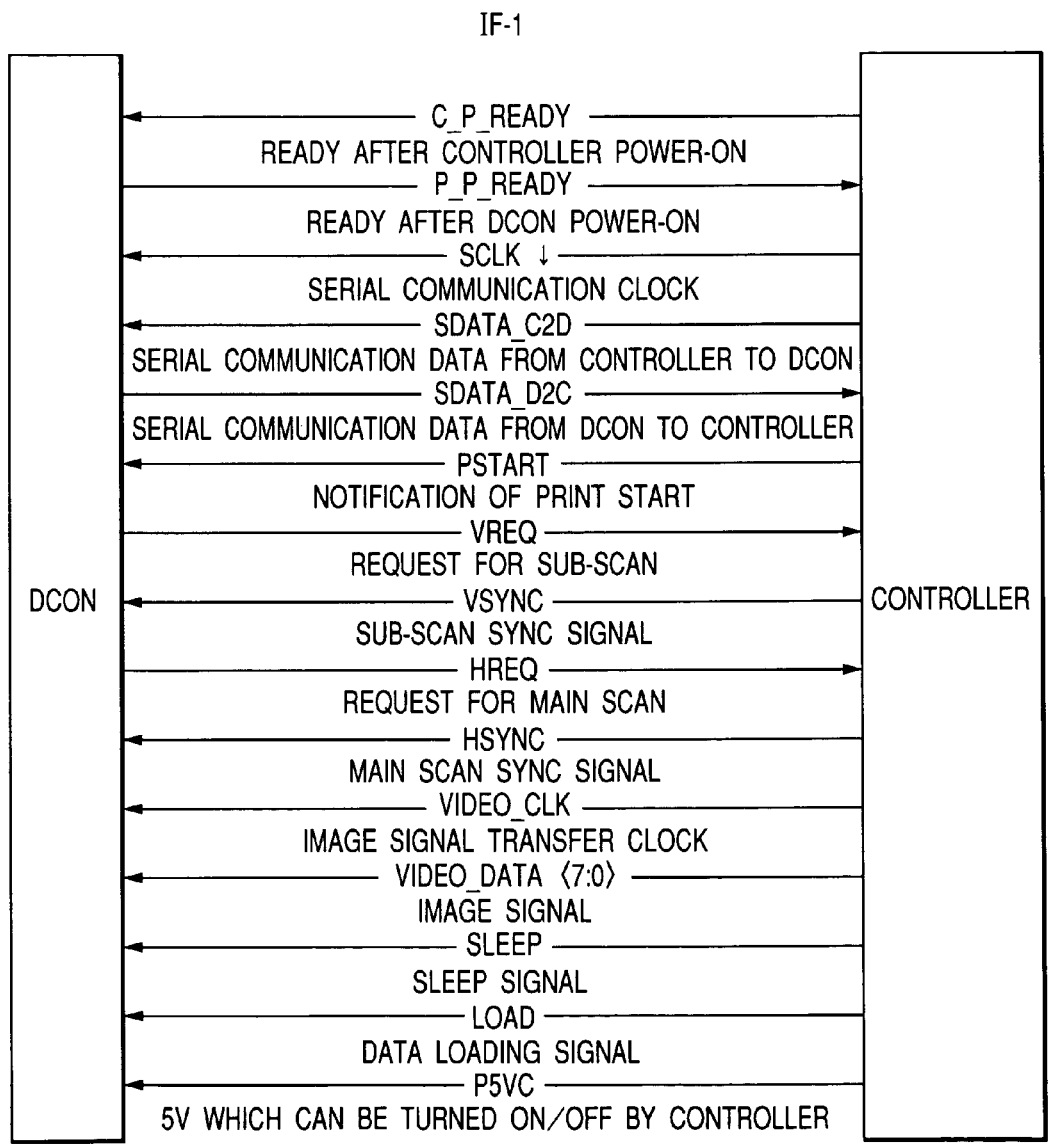
FIG. 4 is a diagram for explaining an interface between a controller and the DCON shown in FIG. 2.

FIG. 4 is a diagram for explaining an interface between the controller 202 and the DCON 201 shown in FIG. 2.

In FIG. 4, C_P_READY is a signal for allowing the DCON 201 to confirm that the controller 202 is ready for communication. P_P_READY is a signal for allowing the controller 202 to confirm that the DCON is ready for communication.

SCLK↓ is a clock signal for serial communication. SDATA_C2D is a data signal from the controller for serial communication to the DCON 201. SDATA_D2C is a data signal from the DCON 201 for serial communication to the controller 202.

PSTART is a signal for allowing the controller 202 to notify the DCON 201 of the print start. VREQ is a signal for allowing the DCON 201 to request the controller to start outputting the video data of the sub-scan in response to the PSTART signal. VSYNC is a signal for allowing the controller 202 to notify the DCON 201 of the start of the output of valid main scan lines after a predetermined number of main scan lines and is the signal subsequent to VREQ.

HREQ is a signal for allowing the DCON 201 to request the controller 202 to start outputting the video data of the main scan every main scan. HSYNC is a signal for allowing the controller to notify the DCON of the output of the valid video data after a predetermined number of transfer clocks VIDEO_CLK and is the signal subsequent to HREQ. VIDEO_CLK is the transfer clock of VIDEO_DATA.

VIDEO_DATA is a video data signal of 8 bits. SLEEP is the signal which is set to the high level in the sleep mode and outputted from the controller 202 to the DCON 201. LOAD is the signal for loading the data obtained by the serial/parallel conversion and the data obtained by the parallel/serial conversion and is the signal for controlling a current supply to a part of the sensors. P5VC is the power source of 5V which is supplied from the controller 202 to the DCON 201 and can be on/off controlled.

Figure 5:
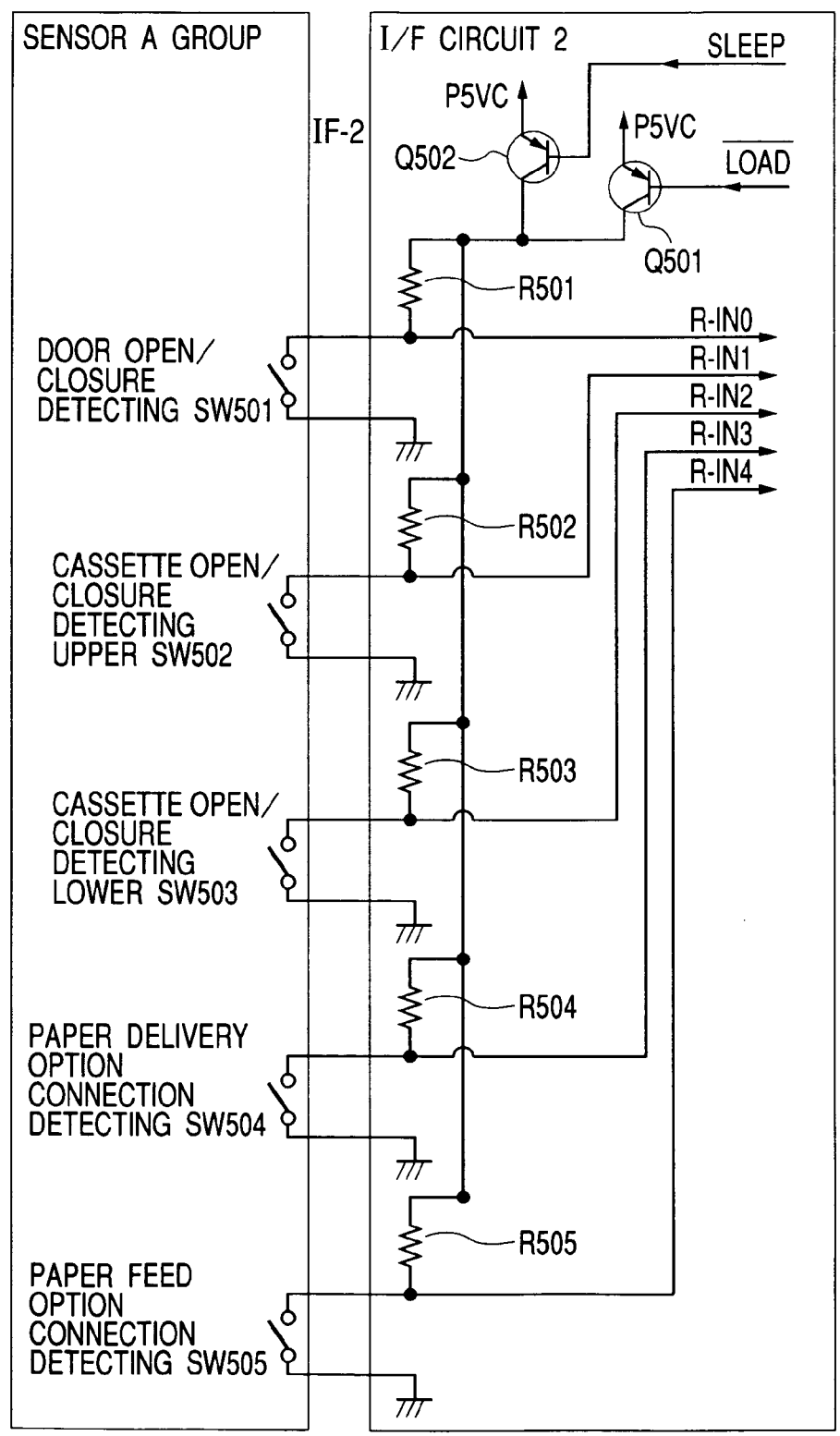
FIG. 5 is a diagram for explaining an interface between the DCON and a sensor A group shown in FIG. 2.

FIG. 5 is a diagram for explaining an interface between the DCON 201 and the sensor A group 208 shown in FIG. 2. The sensor A group 208 is a group of the sensors comprising mechanical microswitches shown in FIGS. 3A and 3B. The same and similar component elements as those in FIGS. 3A and 3B are designated by the same reference numerals.

In FIG. 5, SW501 is a door open/closure detecting switch for detecting the open/closure of a door which needs to be opened when the user accesses a processing system such as fixing unit, drum cartridge, or the like. SW502 is a cassette open/closure detecting upper switch for detecting the open/closure of an upper cassette.

SW503 is a cassette open/closure detecting lower switch for detecting the open/closure of a lower cassette. SW504 is a paper delivery option connection detecting switch for detecting the connection of a paper delivery option. SW505 is a paper feed option connection detecting switch for detecting the connection of a paper feed option. In FIG. 5, P5VC denotes the power source.

Q501 and Q502 denote PNP transistors each for controlling on/off of the power source which is supplied to each of the switches SW501 to SW505.

R501, R502, R503, R504, and R505 denote resistors each for limiting a value of a current which is supplied to each of the switches SW501 to SW505.

R-IN0 denotes a signal for detecting the on/off of the SW501. R-IN1 denotes a signal for detecting the on/off of the SW502. R-IN2 denotes a signal for detecting the on/off of the SW503. R-IN3 denotes a signal for detecting the on/off of the SW504. R-IN4 denotes a signal for detecting the on/off of the SW505. The SLEEP signal and the LOAD signal are the signals each for controlling the power supply of P5VC.

According to such a construction, in the I/F circuit 301, when the PNP transistors Q501 and Q502 are ON, the on/off of the switches SW501 to SW505 can be detected.

If the on/off detection of the switches SW501 to SW505 is unnecessary, the transistors Q501 and Q502 are controlled to the off state and no current is supplied to the switches SW501 to SW505, so that consumption of energy can be suppressed.

Figure 6:
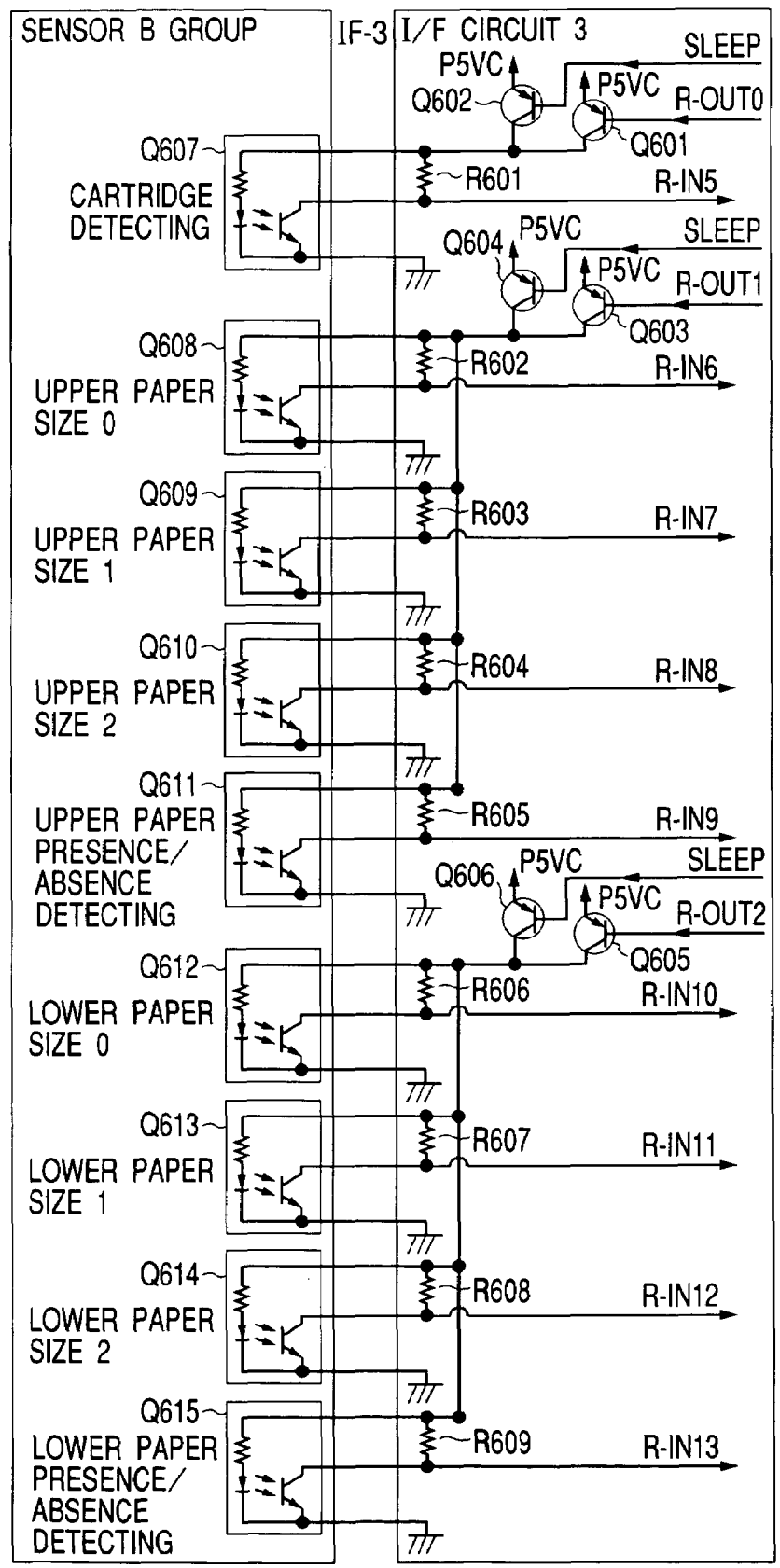
FIG. 6 is a diagram for explaining an interface between the DCON and a sensor B group shown in FIG. 2.

FIG. 6 is a diagram for explaining an interface between the DCON 201 and the sensor B group 209 shown in FIG. 2. The sensor B group is a group of the sensors comprising photointerrupters shown in FIGS. 3A and 3B.

In FIG. 6, Q607 denotes a cartridge detecting sensor for detecting the presence or absence of a cartridge. Q608, Q609, Q610, and Q611 denote an upper paper size 0 sensor, an upper paper size 1 sensor, an upper paper size 2 sensor, and an upper paper presence/absence sensor for detecting a size of paper enclosed in an upper cassette, respectively.

Q612, Q613, Q614, and Q615 denote a lower paper size 0 sensor, a lower paper size 1 sensor, a lower paper size 2 sensor, and a lower paper presence/absence sensor for detecting a size of paper enclosed in a lower cassette, respectively.

The I/F circuit 3 is the interface circuit with the sensor B group shown in FIGS. 3A and 3B. P5VC is the power source shown in FIGS. 3A and 3B. The SLEEP signal and a signal from R-OUT0 are input signals of the I/F circuit 3 shown in FIGS. 3A and 3B. The power supply to the photointerrupter sensors is controlled by those signals. R-IN5 to R-IN13 denote output signals from the I/F circuit 3 according to outputs of the sensors. Since the power source is efficiently supplied to the sensor B group as necessary as mentioned above, the sensor information can be efficiently obtained and the electric power saving can be realized.

Q602, Q604, and Q606 denote PNP transistors which are on/off controlled by the SLEEP signal and control the power supply to the photointerrupter sensors, respectively. Q601, Q603, and Q605 denote PNP transistors which are on/off controlled by R-OUT0, R-OUT1, and R-OUT2 and control the power supply to the photointerrupter sensors, respectively. R601 to R609 denote current limiting resistors for controlling the currents to the photointerrupters, respectively.

In such a construction, since the sensor B group has a construction such that the power supply is selected in accordance with the transmission data, the current supply to the photointerrupter sensors can be turned off in the cases other than the necessary case. Thus, the electric power consumption in the sleep mode can be reduced.

FIG. 7 is a diagram for explaining a detailed construction of the controller 202 shown in FIG. 2.

In FIG. 7, reference numerals 701 to 708 denote interface circuits (I/F circuits) each for realizing an interface between a specific device and a 1-chip microcomputer Q702 or the main chip Q701.

In FIG. 7, each of P5VA, P5VB, and P5VC denotes the power source of 5V. Each of P5VA and P5VB indicates the power source which is supplied from the DC power source 203. P5VA is always supplied to drive the sub-CPU or the like. P5VB is supplied only during the image forming operation such as a copying/printing operation or the like or in the standby mode. P5VC is the power source which is realized on the basis of the power source of P5VA and is the power source which is on/off controlled by Q705 in the controller so as to intermittently supply the power source to the DCON and the RCON, respectively. By saving the power source other than P5VA in the power saving mode (sleep mode), unnecessary electric power consumption can be reduced. Particularly, since P5VB stops the power supply circuit in the power source, a large effect of reducing the electric power consumption can be obtained.

P5VA, P5VB, and P5VC are applied not only to FIG. 7 but also to FIGS. 3A, 3B, 4, 5, 6, 8A, 8B, 9, and 10 in common. The power sources P5VA, P5VB, and P5VC in those diagrams are controlled in accordance with flowcharts of FIGS. 11, 12, 13, and 14, respectively.

The main chip Q701 includes: a microprocessor for executing control programs stored in a ROM Q703 by using a RAM Q704 which is backed up by a battery BT 701 even if the power source is OFF and holds the data as a work area; an interruption control circuit for controlling various interruption signals; a DMA control circuit; various timers; an image processing circuit; a resolution converting circuit; input/output port interface circuits; and the like. The main chip Q701 controls the whole controller.

Further, the main chip Q701 is connected to X'tal X701 and includes a PLL circuit for generating internal operation clocks. The PLL circuit has a function for stopping the generation of the clocks when the microprocessor enters the sleep mode for saving the electric power and suppressing the electric power consumption of the whole chip.

The 1-chip microcomputer (sub-chip) Q702 has a circuit similar to that of a general microcomputer comprising a CPU, a RAM, a ROM, and the like. A microcomputer of small electric power consumption is used as such a microcomputer because a logic which is complicated more than the main chip is not used, a clock frequency of the CPU is low, it has a memory of a small capacity, and the like. Partial ordinary operations of the main chip such as status update, driving of the LAN-UNIT 207 for notifying the outside of the information, and the like can be executed by the 1-chip microcomputer even in the sleep mode. The power control in the sleep mode, status monitoring, monitoring of commands from the network, response, and the like can be also executed although they will be explained in detail hereinlater.

An interruption signal 709 from the 1-chip microcomputer (sub-chip) Q702 is inputted to an NMI (non-maskable interruption) terminal of the main controller (main chip) Q701. When the interruption signal is inputted to the NMI terminal if the microprocessor is in the sleep mode, the sleep mode is cancelled, the PLL circuit is enabled, the clock is supplied to the whole main chip, and the main chip restarts the operation.

The 1-chip microcomputer Q702 monitors the sensor signals of the RCON 216 and the DCON 201 in the sleep mode and monitors a sleep recovery signal of the FAX-UNIT 206. Further, in the sleep mode, the microcomputer Q702 sends a command response and the status information to the LAN-UNIT 207 in place of the main chip Q701.

The 1-chip microcomputer Q702 and the main chip Q701 can transmit and receive commands and data by serial communication 710. The interruption signal 709 from the 1-chip microcomputer Q702 mentioned above is inputted to the NMI terminal of the main chip. An ACTIVE signal 711 indicating whether the main chip Q701 is in the sleep mode or the operative mode is also inputted.

The power switch 223 is provided on the operation unit 222. The digital hybrid apparatus of the embodiment is shifted to the sleep mode or recovered from the sleep mode by an input of the power switch 223.

The timing to shift to the sleep mode is not limited to the timing of the input of the power switch 223 but the apparatus can be also automatically shifted to the sleep mode when the digital hybrid apparatus is held in the standby mode for a predetermined time which can be selected by the setting from the operation unit 222.

The timing for recovery from the sleep mode is not limited to the timing of the input of the power switch 223 but the apparatus can be also recovered by a command from the LAN, a call signal from the telephone line, or the like as will be explained hereinlater.

A SLEEP signal 712 indicative of the shift to the sleep mode is set to the high "H" level in the sleep mode. The signal is sent from the main chip Q701 to the RCON 216 via an I/F circuit 706 with the RCON and to the DCON 201 via an I/F circuit 701 with the DCON.

In the sleep mode, the power sources other than P5VA as a DC power source is turned off by a control signal from the 1-chip microcomputer Q702 and, further, the power source of P5VC is also intermittently turned on/off by the transistor Q705, thereby reducing the electric power consumption.

The RCON 216 A/D converts the image signal obtained from the photoelectric converting device such as a CCD or the like, executes a reading image process such as a shading process or the like to the obtained digital signal, and outputs a video signal of 8 bits.

Signals indicative of statuses of various sensors such as an original size and the like are also outputted to the controller and, further, a motor of the reader unit is controlled. The I/F-9 has signal lines of a vertical sync signal (output), a horizontal sync signal (output), a vertical sync request signal (input), a horizontal sync request signal (input), the clock (output), the video signal of 8 bits (input), a video signal ready signal (input), the SLEEP signal 712 (output), the LOAD signal (output), and the like. Further, the sensor information of the RCON is inputted by the serial communication.

The I/F circuit 706 with the RCON 216 sends each of the signals of the I/F-9 to the main chip Q701. However, since the main chip Q701 cannot receive the signals in the sleep mode, they are sent to the 1-chip microcomputer Q702. Such a switching operation is executed by the SLEEP signal 712 from the main chip Q701.

The DCON 201 records the images as described in FIGS. 3A and 3B. The I/F-1 has the signal lines described in FIG. 4. The sensor signal of the DCON 201 is inputted together with the command status signal by the serial communication.

The I/F circuit 701 with the DCON 201 sends the signals of the I/F-1 to the main chip Q701. However, since the main chip Q701 cannot receive the signals in the sleep mode, they are sent to the 1-chip microcomputer Q702. Such a switching operation is executed by the SLEEP signal 712 from the main chip Q701.

In the I/F-1, it is also possible to construct in a manner such that eight VIDEO_DATA signals are used to transfer the image signal in the normal mode and they are switched to the seven sensor signals and the LOAD signal by the SLEEP signal in the sleep mode and the switched signals are used, thereby reducing the number of signal lines of the I/F-1.

When the image is read out, the video signal which is inputted from the RCON 216 via the I/F-9 is transferred to the image processing unit, subjected to an image process, and stored into the RAM Q704.

When the image is recorded, the image data in the RAM Q704 is read out, image processes and resolution conversion are executed on the basis of a size of recording paper and various settings, and the image data is outputted to the DCON 201 via the I/F-1.

The LAN-UNIT 207 includes: a physical layer (PHY) for connecting to the Ethernet (registered trademark); an Ethernet (registered trademark) connecting circuit for controlling an MAC layer; a LAN control unit for making communication control of IEEE802.3; and the like.

A LAN-UNIT I/F circuit 702 is an interface circuit of USB or IEEE1284, sends the information received via the I/F-10 from the LAN-UNIT 207 to the main chip Q701 and sends the information from the main chip to the LAN-UNIT 207.

For example, if the command to request the status of the digital hybrid apparatus of the embodiment is detected via the LAN-UNIT 207, the status request command is sent from the LAN-UNIT I/F circuit to the main chip Q701. The main chip Q701 transfers the necessary status held in a storing unit (RAM) from the main chip Q701 to the LAN-UNIT I/F circuit. The LAN-UNIT I/F circuit sends this information to the LAN-UNIT via the I/F-10.

If a print job is issued from the PC on the network, a command to request the print is sent from the LAN-UNIT I/F circuit to the main chip Q701. When the apparatus enters a print ready mode, a response indicative of the print ready state is sent from the main chip Q701 to the LAN-UNIT I/F circuit. The LAN-UNIT I/F circuit sends this information to the LAN-UNIT via the I/F-10.

When the PC (information processing apparatus) on the network receives this response, it subsequently transmits the print data. Therefore, the print data is inputted to the main chip Q701 by a similar signal flow and subjected to necessary image processes by the main chip Q701 and, thereafter, the processed print data is temporarily stored into the RAM. In a manner similar to the processes upon image recording, the image data is sent as an image signal of the I/F-1 to the DCON and recorded.

The above operations relate to the case where the main chip Q701 is normally operating and the operations in the sleep mode are slightly different from them.

In the sleep mode, the transmission and reception of the commands to/from the network are executed by the 1-chip microcomputer Q702. The LAN-UNIT I/F circuit 702 transfers the information received via the I/F-10 from the LAN-UNIT 207 to the 1-chip microcomputer Q702 and sends the information from the 1-chip microcomputer Q702 to the LAN-UNIT 207.

In the sleep mode, since the main chip Q701 is in the sleep mode and is in a state where the signals cannot be transmitted and received, the 1-chip microcomputer Q702 receives the status information from the I/F circuit 706 with the RCON 216 and the I/F circuit 701 with the DCON 201 and monitors them. As will be described in other diagrams (flowcharts), when the status request command is received from the LAN-UNIT 207, the 1-chip microcomputer Q702 sends the status information as a response to the LAN-UNIT.

If the sleep mode of the digital hybrid apparatus is cancelled by a reason such that the print job to the digital hybrid apparatus in the embodiment is generated in the sleep mode or the like, first, the 1-chip microcomputer Q702 discriminates whether the command received from the LAN-UNIT have the contents which cannot be processed if the apparatus is not recovered from the sleep mode or not. If the command such as a print request which cannot be processed if the apparatus is not recovered from the sleep mode is received, the 1-chip microcomputer Q702 instructs a power control I/F circuit 705 to turn on the power source in the off state in the sleep mode. The power control I/F circuit sends a power-on signal to the DC power source 203.

The 1-chip microcomputer Q702 outputs the interruption signal (NMI) 709 to the NMI terminal of the main chip Q701. The main chip Q701 which received the interruption signal 709 from the NMI terminal is shifted from the sleep mode to the normal mode as will be explained with reference to another diagram (flowchart). When the 1-chip microcomputer Q702 confirms by the ACTIVE signal 711 that the main chip Q701 has entered the normal mode, the 1-chip microcomputer Q702 notifies the main chip Q701 of the contents of the received command by the serial communication 710. If the main chip Q701 determined that the digital hybrid apparatus has been set to the mode in which the received command can be processed (for the print command, when it is confirmed that the apparatus has been activated to the recording ready mode), the main chip Q701 sends the necessary response to the LAN-UNIT.

The FAX-UNIT 206 includes: a CODEC for encoding and decoding the image data; a MODEM for modulating the encoded data in order to perform the FAX transmission and demodulating the received FAX signal; a FAX control unit for executing a FAX protocol; a CI detecting circuit for detecting a call signal (CI) and outputting a CI detection signal; an off-hook detecting circuit for detecting an off-hook and outputting an off-hook detection signal; and the like.

An I/F circuit 703 with the FAX-UNIT is an IEEE1284 interface circuit and transmits and receives commands and the image data to/from the FAX-UNIT 206 via the I/F-11. The I/F circuit 703 also receives the CI detection signal (input) and the off-hook detection signal (input).

Upon FAX transmission, the image data stored in the RAM Q704 is sent to the FAX-UNIT and FAX-transmitted. Upon FAX reception, the image data is received from the FAX-UNIT and temporarily stored into the RAM. In a manner similar to the processes upon image recording, the image data is sent as an image signal of the I/F-1 to the DCON and recorded.

In the sleep mode, the CI detection signal and the off-hook detection signal in the I/F-11 are monitored. When the CI incoming call or the off-hook is detected, an ACTIVATION signal 713 from the FAX is sent to the 1-chip microcomputer Q702 and the main chip Q701. The 1-chip microcomputer which received the ACTIVATION signal from the FAX activates the power source, recovers the main controller from the sleep mode, and sets the apparatus into a state where it can respond to the command from the FAX-UNIT.

Although the ACTIVATION signal 713 from the FAX has been inputted to both of the 1-chip microcomputer Q702 and the main chip Q701 in the above description, it is also possible to construct in a manner such that the FAX-ACTIVATION signal 713 is inputted only to the 1-chip microcomputer Q702 and it is notified that the 1-chip microcomputer Q702 has been activated by the ACTIVATION signal from the FAX-UNIT by the serial communication 710.

Figures 8, 8A:
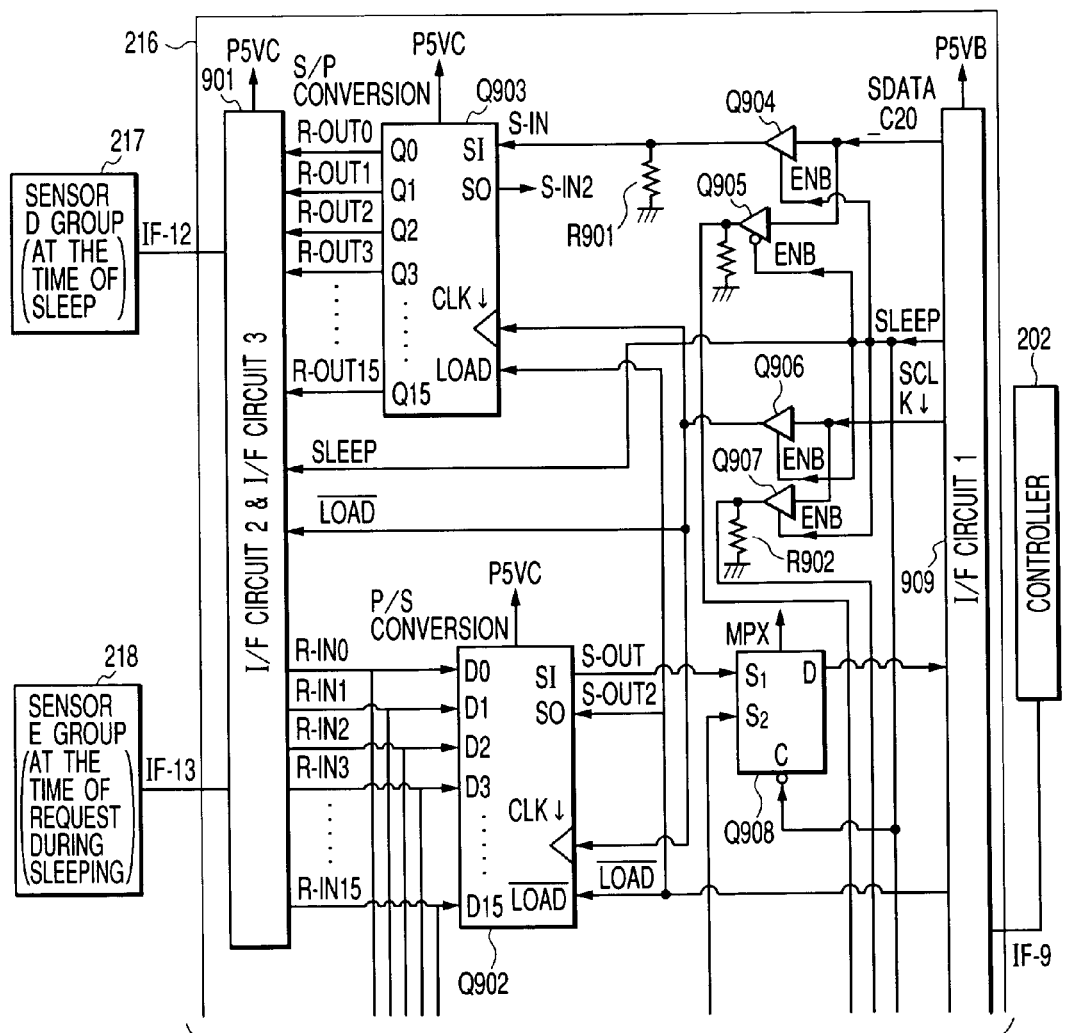
FIG. 8 which comprised of FIGS. 8A and 8B is a diagram for explaining a construction of an RCON shown in FIG. 2.
Figure 8B:
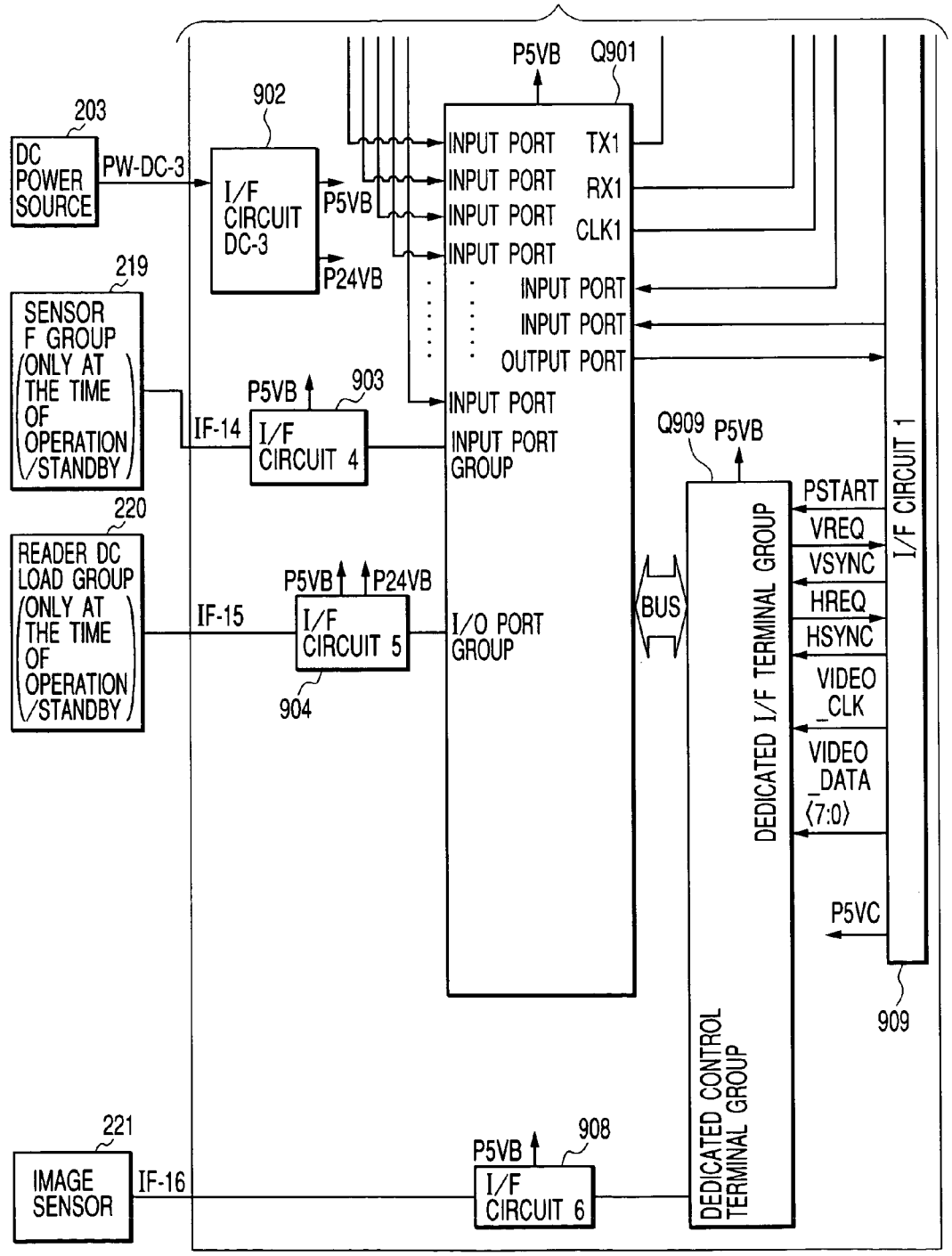

FIGS. 8A and 8B are diagrams for explaining a construction of the RCON 216 shown in FIG. 2 and the same and similar component elements as those in FIG. 2 are designated by the same reference numerals.

In FIGS. 8A and 8B, the RCON 216 has a construction such that the printer DC load group 211 is replaced with the reader DC load group 220 in FIG. 2 as compared with the DCON shown in FIGS. 3A and 3B. Reference numerals 901 to 904, 908, and 909 denote interface circuits (I/F circuits). The I/F circuit 901 has an I/F circuit 2 and an I/F circuit 3 of the RCON 216. The I/F circuit 902 has an I/F circuit DC3 of the RCON 216.

The I/F circuit 903 has an I/F circuit 4 with the RCON 216. The I/F circuit 904 has an I/F circuit 5 of the RCON 216. The I/F circuit 908 is an I/F circuit 6 of the RCON 216. The I/F circuit 909 is an I/F circuit 1 of the RCON 216.

The AC driver 205, I/F circuit 305, paper delivery option 213, I/F circuit 306, paper feed option 214, I/F circuit 307, units 212 regarding the laser, and I/F circuit 308 in FIGS. 3A and 3B do not exist in the RCON 216. The signal lines connected to those component elements do not exist. The image sensor 221 is a sensor for reading the image.

PW-DC-3 is the power I/F of the RCON 216. Q901 denotes a microcomputer of the RCON 216. Q902 denotes a parallel/serial (P/S) converter of the RCON 216. Q903 denotes a serial/parallel (S/P) converter of the RCON. Q904 denotes a tristate buffer of the RCON 216. Q906 denotes a tristate buffer of the RCON 216.

Figure 9:
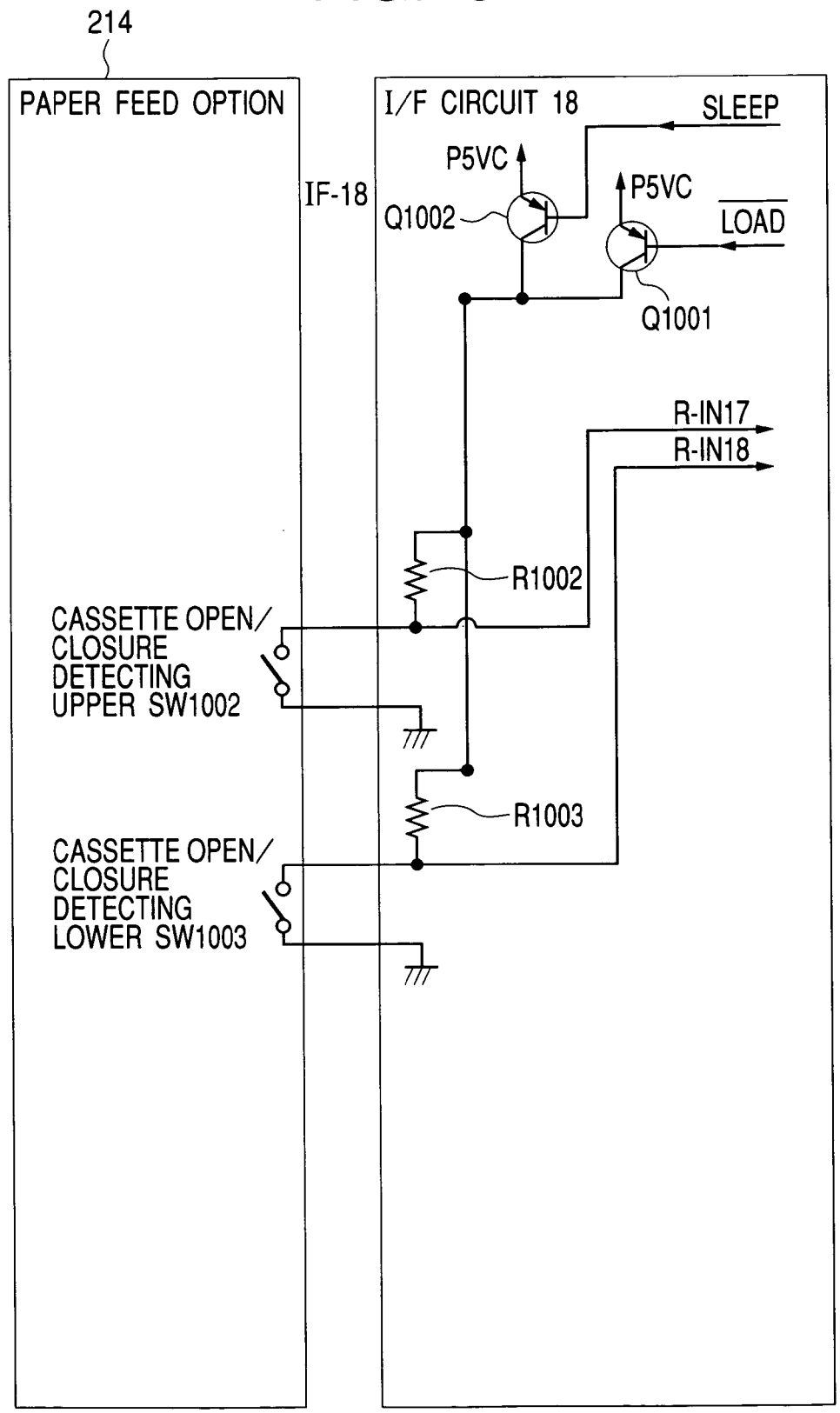
FIG. 9 is a diagram for explaining details of an I/F circuit of an option of a paper feed system shown in FIG. 3.

FIG. 9 is a diagram for explaining details of the I/F circuit 18 of the paper feed option 214 shown in FIGS. 3A and 3B. Fundamental construction and operation are substantially the same as those of the RCON 216 and the I/F circuit 2 of the DCON 201.

In FIG. 9, SW1002 denotes a cassette open/closure detecting upper switch for detecting the open/closure of an upper cassette. SW1003 denotes a cassette open/closure detecting lower switch for detecting the open/closure of a lower cassette. P5VC is the power source shown in FIGS. 3A and 3B.

Q1001 and Q1002 denote PNP transistors for controlling the on/off of power sources which are supplied to the switches SW1002 and SW1003. R1002 and R1003 denote resistors for limiting values of currents which are supplied to the switches SW1002 and SW1003.

R-IN 17 denotes a signal for detecting the on/off of the switch SW1002. R-IN 18 denotes a signal for detecting the on/off of the switch SW1003. The SLEEP signal and the LOAD signal are the signals for controlling the power supply of P5VC.

In such a construction, in the I/F circuit 18, the on/off of the switches SW1002 and SW1003 can be detected when the transistors Q1001 and Q1002 are ON.

If the on/off detection of the switches SW1002 and SW1003 is unnecessary, the transistors Q1001 and Q1002 are turned off and the currents are not supplied to the switches SW1002 and SW1003, thereby enabling the energy consumption to be suppressed.

Figure 10:
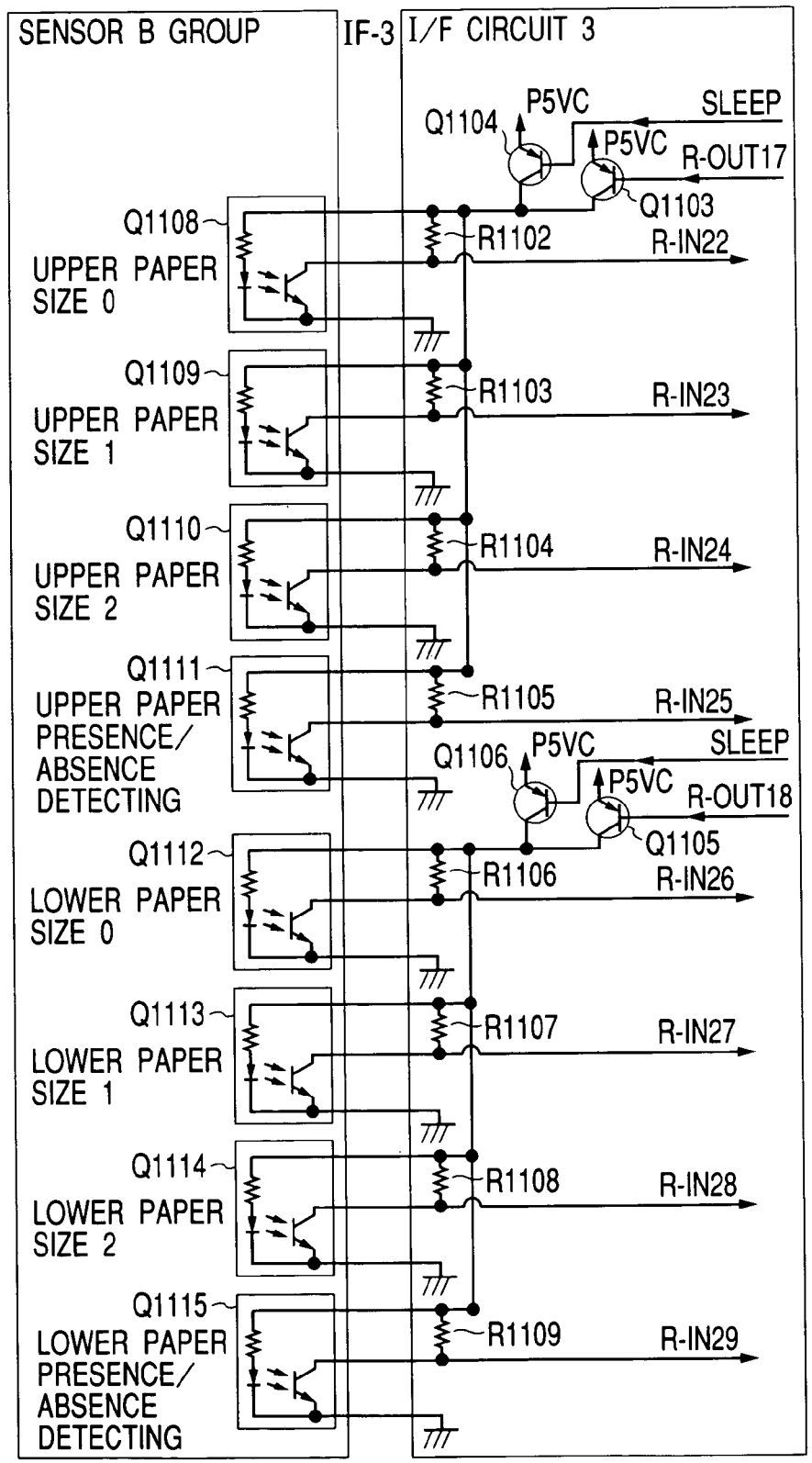
FIG. 10 is a diagram for explaining an interface between the I/F circuit of the paper feed system option and a sensor B group shown in FIG. 3.

FIG. 10 is a diagram for explaining an interface between the I/F circuit 3 of the paper feed option 214 and the sensor B group 209 shown in FIGS. 3A and 3B. Fundamentally, this interface has a construction similar to that of each of the RCON and the DCON and executes a similar operation. The sensor B group is a group of the sensors comprising the photointerrupters.

In FIG. 10, Q1108 denotes an upper paper size 0 sensor for detecting a size of paper enclosed in the upper cassette. Q1109 denotes an upper paper size 1 sensor for detecting the size of paper enclosed in the upper cassette. Q1110 denotes an upper paper size 2 sensor for detecting the size of paper enclosed in the upper cassette. Q1111 denotes an upper paper presence/absence sensor for detecting the presence or absence of the paper in the upper cassette.

Q1112 denotes a lower paper size 0 sensor for detecting a size of paper enclosed in the lower cassette. Q1113 denotes a lower paper size 1 sensor for detecting the size of paper enclosed in the lower cassette. Q1114 denotes a lower paper size 2 sensor for detecting the size of paper enclosed in the lower cassette. Q1115 denotes a lower paper presence/absence sensor for detecting the presence or absence of the paper in the lower cassette.

P5VC is the power source shown in FIGS. 3A and 3B. The SLEEP signal, R-OUT 17, and R-OUT 18 indicate the input signals of the I/F circuit 3. The power supply to the photointerrupter sensors is controlled by those signals.

R-IN 22 to R-IN 29 denote output signals from the I/F circuit 3.

Q1104 and Q1106 denote PNP transistors which are on/off controlled by the SLEEP signal and control the power supply to the photointerrupter sensors.

Q1103 and Q1105 denote PNP transistors which are on/off controlled by R-OUT 17 and R-OUT 18 and control the power supply to the photointerrupter sensors, respectively. R1102 to R1109 denote current limiting resistors for controlling the currents to the photointerrupters, respectively.

By the construction as mentioned above, the current supply to the photointerrupter sensors can be turned off in the cases other than the necessary case.

In the above construction, the shift to the power saving sleep mode, the recovery to the normal mode, and the status monitoring of the DCON and the RCON, the command monitoring from the LAN-UNIT, and the status transmission to the LAN-UNIT in the sleep mode are controlled by the 1-chip microcomputer Q702 (hereinafter, referred to as a sub-CPU) and the main chip Q701 (hereinafter, referred to as a main CPU). Those operations will be described hereinbelow with reference to flowcharts of FIGS. 11, 12, 13, and 14.

Figure 11:
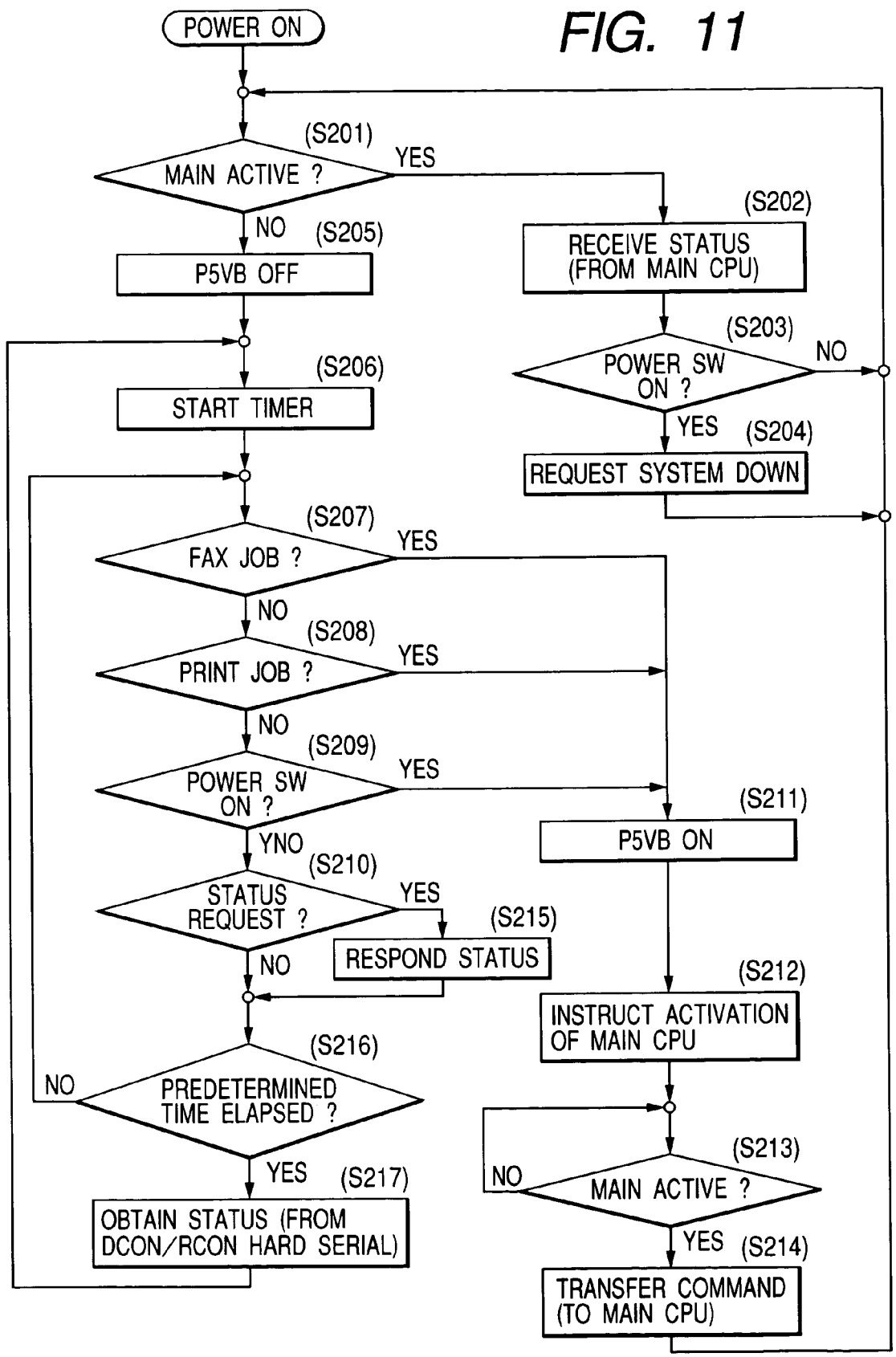
FIG. 11 is a flowchart showing an example of a first control procedure in the image forming apparatus according to the invention.

FIG. 11 is the flowchart showing an example of a first control procedure in the image forming apparatus according to the invention and corresponds to an operating procedure of the sub-CPU. S201 to S217 denote processing steps.

The sub-CPU is connected to the DC power source P5VA and is always operating. The operation is mainly classified into the operation in the sleep mode in which the main CPU is in a halt mode and the operation in the normal mode in which the main CPU is executing the normal operation. First, the normal mode will be described.

Whether the ACTIVE signal 711 from the main CPU is ON or not is discriminated. If it is ON (S201), the apparatus is in the normal mode and the statuses of the DCON 201 and the RCON 216 are received from the main CPU (S202). The operation to monitor the power switch 223 is repeated (S203).

If it is determined that the power switch 223 has been pressed, a system-down request (SYSTEM DOWN) is transmitted to the main CPU so as to shift the whole system to the power saving sleep mode (S204). The reception of the statuses and the request for the system-down are executed by using the serial communication 710 between the sub-CPU and the main CPU.

When the ACTIVE signal from the main CPU is turned off (S201), the apparatus is shifted to the power saving sleep mode. Factors by which the ACTIVE signal is turned off will be explained hereinafter. When the apparatus is shifted to the power saving sleep mode, first, the power control I/F circuit 705 is instructed to turn off the power source P5VB to the system of the DCON 201 and the RCON 216 (S205).

Subsequently, a timer to monitor the statuses of the DCON 201 and the RCON 216 is started (S206). This timer counts a time interval for obtaining the statuses. In the embodiment, a time interval of 100 msec is counted.

The operation to monitor whether there is a FAX job request or not (S207), whether there is a print job request or not (S208), whether the power switch has been pressed or not (S209), and whether there is a status request from the external apparatus or not (S210) is repeated until the time interval of 100 msec is counted. If there is the job request (YES in S207, S208) and if the power switch has been pressed (YES in S209), the power control I/F circuit 705 is instructed to turn on the power source P5VB to the system of the DCON 201 and the RCON 216 (S211). The main CPU ACTIVATION signal 709 is turned on (S212). After that, the apparatus waits for the activation of the main CPU (ACTIVATION signal is ON) (S213). The information such as factors of the activation in step S209, commands received from the LAN-UNIT in steps S207 and S208, and the like is transferred to the main CPU (S214). The processing routine is returned to step S201 and the apparatus is shifted to the normal mode.

The presence or absence of the FAX job in step S207 is discriminated by the CI detection signal and the off-hook detection signal which are supplied from the FAX-UNIT I/F circuit 703 mentioned above. The presence or absence of the print job is discriminated by the command which is supplied from the LAN-UNIT I/F circuit 702 mentioned above and this command is transferred to the main CPU.

If the status request is made by the external apparatus (S210), the held latest statuses are transmitted to the external apparatus via the LAN-UNIT (S215). The status information transmitted (notified) to the external apparatus is displayed as status information onto a display unit provided for the external apparatus. The user can confirm the latest statuses.

The statuses of the DCON 201 and the RCON 216 which are transmitted here are the latest statuses of either the statuses received from the main CPU or the statuses obtained in step S217.

When the status monitoring timer counts 100 msec (naturally, the time interval is not limited to 100 msec) (S216), the statuses are obtained from the DCON 201 and the RCON 216 (S217) and the processes in step S206 and subsequent steps are repeated. Details of the status obtaining operation in step S217 will be explained hereinlater with reference to FIG. 13. Although the above explanation has been made on the assumption that the status monitoring timer has been set to 100 msec, for example, if the status monitoring timer is set to a longer time such as 10 seconds or 30 seconds, the frequency of the power supply on the image forming apparatus side decreases. Thus, the further large power saving effect can be obtained and an effect such that the proper updated latest status can be provided for the user can be obtained.

As mentioned above, according to the flowchart of FIG. 11, the power source of P5VB is saved so long as the processes regarding the image creation or the depression of the power switch is not detected. Despite that the main CPU is in the power saving mode, the sub-CPU of the small electric power consumption can make a response of the statuses to the status request from the outside (S210). Although the statuses which are responded to the outside are updated in accordance with the process in step S217, the power saving is also made in the status process in step S217.

Subsequently, the operation of the main CPU will be described with reference to the flowchart of FIG. 12.

Figure 12:
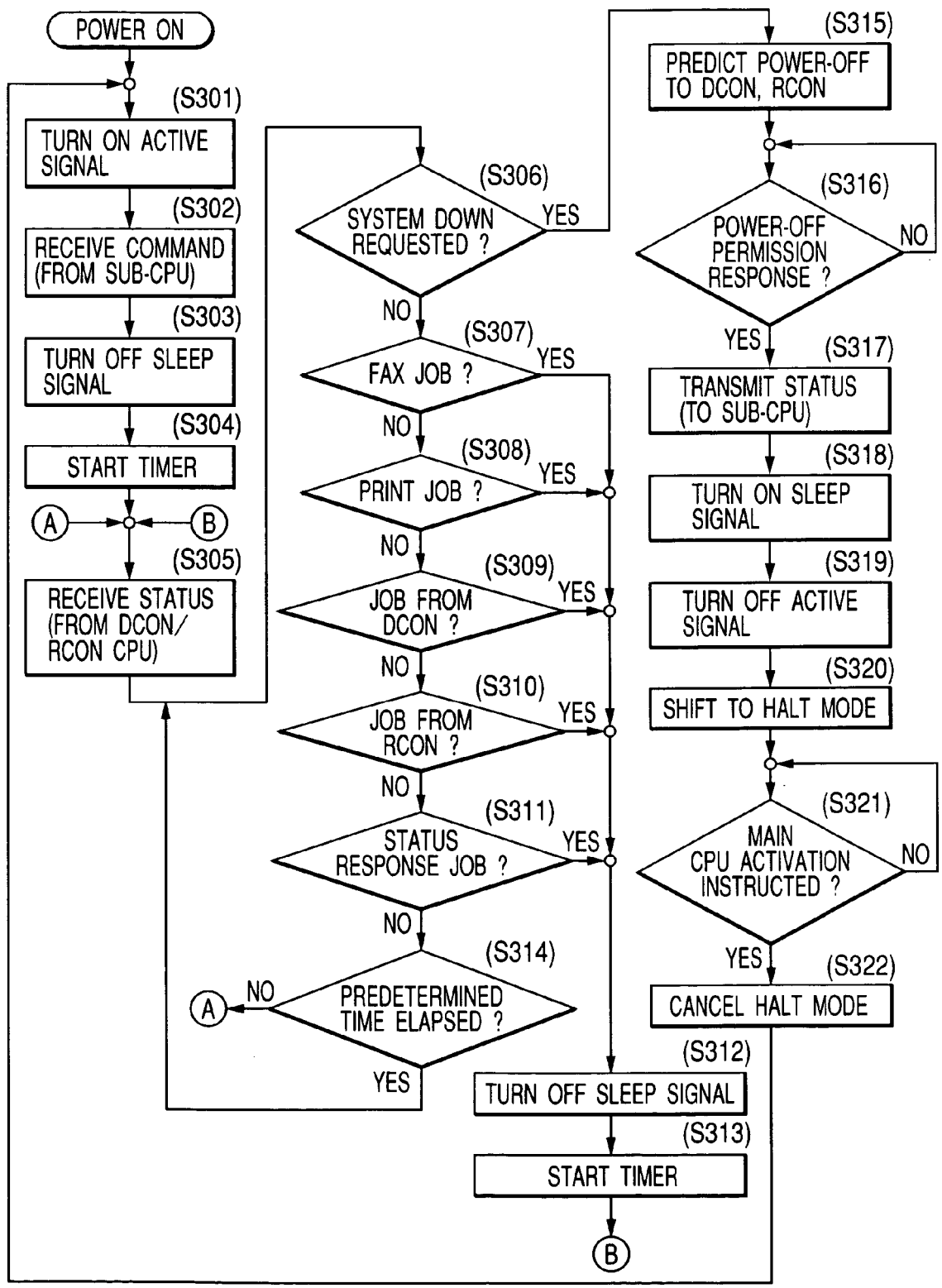
FIG. 12 is a flowchart showing an example of a second control procedure in the image forming apparatus according to the invention.

FIG. 12 is the flowchart showing an example of a second control procedure in the image forming apparatus according to the invention and corresponds to an operating procedure of the main CPU. S301 to S322 denote processing steps.

The main CPU is connected to the DC power source P5VA and is always operating in a manner similar to the sub-CPU. The operation is mainly classified into the operation in the sleep mode in which the main CPU is in the halt mode in which the CPU clock (X701) is stopped and the operation in the normal mode in which all of the operations of the system such as transmission and reception of the FAX, printing operation, scanning operation, status request response from the external apparatus, and the like can be executed.

When the main CPU is shifted to the normal mode (from the halt mode), first, the ACTIVE signal 711 is turned on (S301). As mentioned above, the sub-CPU enters the normal mode by this operation. Subsequently, the factors of the activation and the command are received from the sub-CPU (S302). At this time, the command which is received is the command received by the sub-CPU from the LAN-UNIT. The command is processed in step S307 and subsequent steps.

Subsequently, the SLEEP signal 712 is turned off (S303). As mentioned above, by this operation, in the controller, the serial communication I/F between the DCON-I/F circuit 701 and the DCON 201 and between the RCON-I/F circuit 706 and the RCON 216 is switched from the sub-CPU to the main CPU in the DCON-I/F circuit 701 and the RCON-I/F circuit 706.

Also in the DCON 201 and the RCON 216, the sleep mode of the DCON microcomputer Q301 and the RCON microcomputer Q901 is cancelled simultaneously with that the serial communication I/F is switched from the hardware construction to the DCON microcomputer Q301 and the RCON microcomputer Q901.

Subsequently, a timer to shift to the power saving sleep mode is started (S304). This timer is a timer for counting a time interval which is required when the apparatus is again shifted from the normal mode to the power saving sleep mode. In the embodiment, a time interval of one hour is counted. The operation to monitor whether the statuses from the DCON 201 and the RCON 216 have been received or not (S305), whether there is a system-down request from the sub-CPU or not (S306), whether there is a FAX job request or not (S307), whether there is a print job request or not (S308), whether there is a job request from the DCON microcomputer Q301 or not (S309), whether there is a job request from the RCON microcomputer Q901 or not (S310), and whether there is a status request from the external apparatus or not (S311) is repeated until the time interval of one hour is counted.

If there is the system-down request (S306), a process for shifting to the power saving sleep mode in step S315 and subsequent steps, which will be explained hereinlater, is executed.

If there is the job request, a predetermined job is executed (S312). The time of one hour is again set to the power saving sleep mode shifting timer and the timer is restarted (S313). The processing routine is returned to step S305.

The presence or absence of the FAX job is discriminated by the CI detection signal and the off-hook detection signal which are supplied from the FAX-UNIT I/F circuit 703 mentioned above or by the command received from the sub-CPU in step S302. The presence or absence of the print job is discriminated by the command which is supplied from the LAN-UNIT I/F circuit 702 mentioned above or the command received from the sub-CPU in step S302. The job requests from the DCON and the RCON are received by the serial communication I/F of each of them.

The presence or absence of the status request from the external apparatus is discriminated by the command which is supplied from the LAN-UNIT I/F circuit 702 mentioned above. Any of the general job executing methods can be used and its detailed explanation is omitted.

When the timer for shifting to the power saving sleep mode counts one hour, that is, if one hour has elapsed in a state where no job is executed (naturally, the time interval is not limited to one hour) (S314), the process for shifting to the power saving sleep mode in step S315 and subsequent steps is executed in order to shift to the power saving sleep mode by the main CPU itself.

Subsequently, the process for shifting to the power saving sleep mode in step S315 and subsequent steps will be explained. As mentioned above, this process is the power saving sleep mode shifting process which is executed in the case where there is the system-down request from the sub-CPU (S306) or in the case where the main CPU is shifted to the power saving sleep mode by itself by the power saving sleep mode shifting timer (S314). First, a power-off prediction is transmitted to the DCON and the RCON via the serial communication I/F (S315). The apparatus waits for reception of a power-off permission response from each of the DCON 201 and the RCON 216 (S316).

When the DCON microcomputer and the RCON microcomputer are constructed in a manner such that when the power-off prediction is received, a predetermined power-off process is executed and, after completion of the power-off process, the power-off permission is transmitted to the main CPU.

If the power-off permission responses are received from both of the DCON microcomputer and the RCON microcomputer (S316), the statuses of the DCON and the RCON are transmitted to the sub-CPU (S317). The statuses of the DCON and the RCON which are transmitted here are the latest statuses received from the DCON microcomputer and the RCON microcomputer in step S305.

Subsequently, the SLEEP signal 712 is turned on (S318). As mentioned above, by this operation, in the controller, in the DCON-I/F circuit 701 and the RCON-I/F circuit 706, the serial communication I/F with the DCON and the RCON is switched from the main CPU to the sub-CPU. Also in the DCON and the RCON, the DCON microcomputer and the RCON microcomputer are set to the sleep mode simultaneously with that the serial communication I/F is switched from the DCON microcomputer Q301 and the RCON microcomputer Q901 to the hardware construction.

Subsequently, the ACTIVE signal 711 is turned off (S319). As mentioned above, the sub-CPU enters the power saving sleep mode by this operation.

Subsequently, the main CPU itself is set to the halt mode in which the CPU clock (X701) has been stopped and the shift to the power saving sleep mode is completed (S320). This state is continued until the interruption is caused by the main CPU ACTIVATION signal 709 which is supplied from the sub-CPU. When the interruption is caused (S321), the halt mode is cancelled (S322) and the processing routine advances to step S301 in the normal mode.

Subsequently, the operation by which the sub-CPU obtains the status from the DCON in the power saving sleep mode will be described with reference to the flowcharts of FIGS. 13 and 14.

Figure 13:
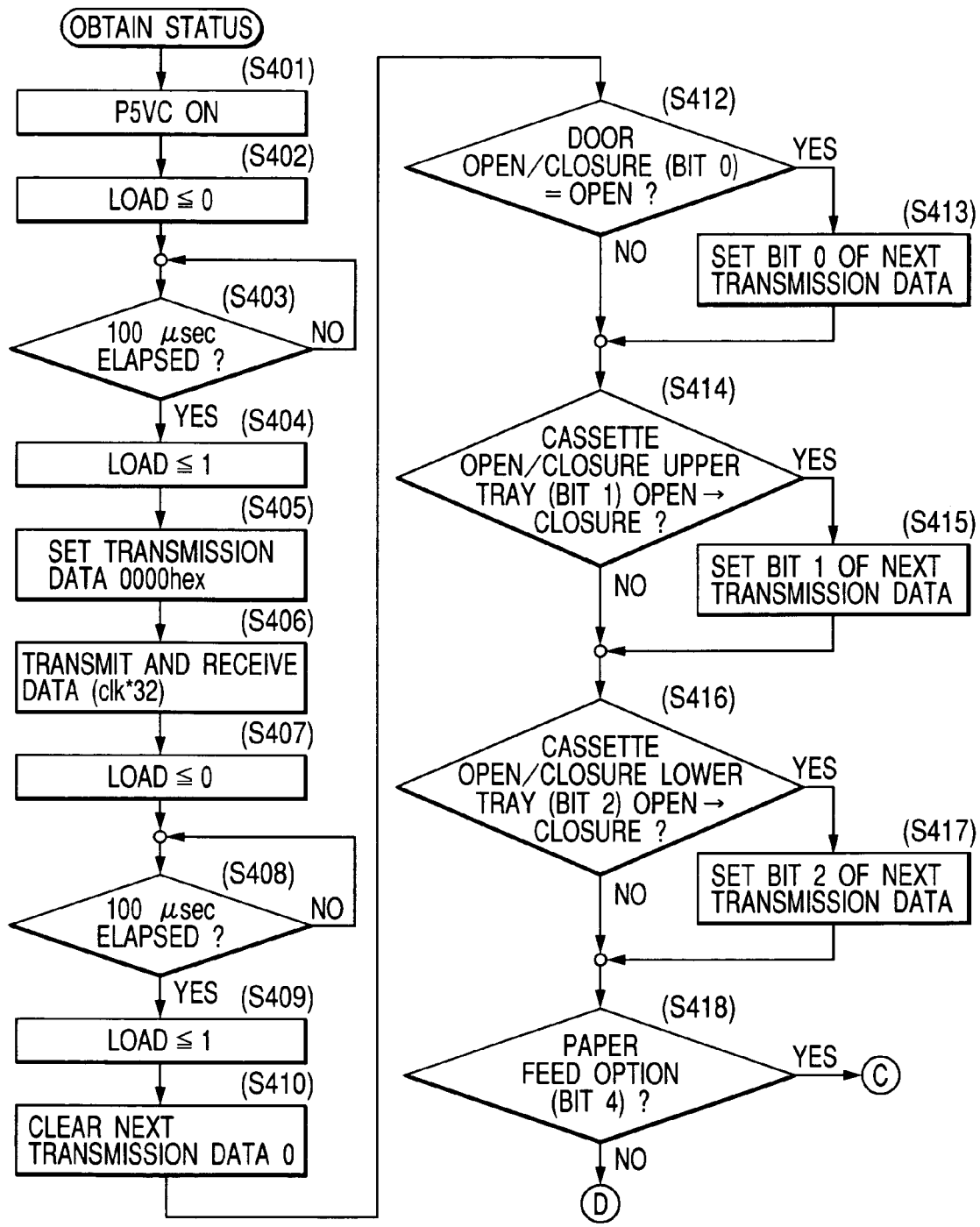
FIG. 13 is a flowchart showing an example of a third control procedure in the image forming apparatus according to the invention.
Figure 14:
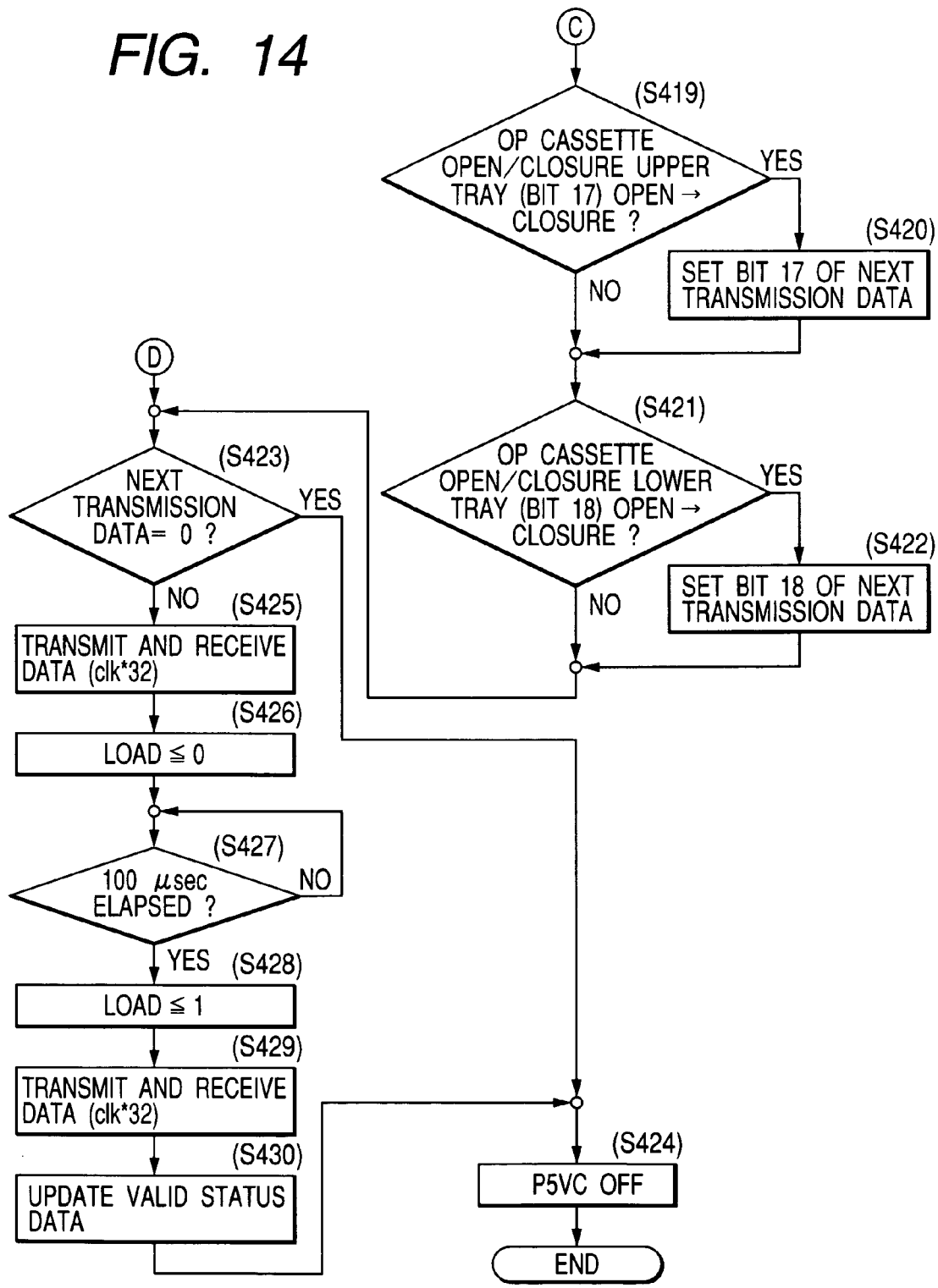
FIG. 14 is a flowchart showing an example of the third control procedure in the image forming apparatus according to the invention.

FIGS. 13 and 14 are the flowcharts showing an example of a third control procedure in the image forming apparatus according to the invention and correspond to an operating procedure (detailed procedure of the status obtainment processing procedure in step S217 shown in FIG. 11) of the sub-CPU. S401 to S430 indicate processing steps, respectively.

First, P5VC is turned on in order to enable a hardware serial communication block of the DCON and the paper feed unit to operate (S401). By driving P5VC, as shown in FIGS. 5 and 6, the currents are supplied to the I/F circuits 2 and 3, so that the sensor A group and the sensor B group are set into a state where they can detect the signals. Thus, it corresponds to the case where upon updating of the status, the supply of the power source (current supply to the sensor groups) necessary for the status updating in which the electric power is saved in the power saving mode is controlled. The status updated according to such control is notified to the external apparatus via the LAN-UNIT 207 on the basis of the processes of the sub-CPU in step S215 in FIG. 11.

Subsequently, the LOAD signal is set to the low "L" level (S402). The apparatus waits for 100 μsec until the input data of the P/S conversion unit Q302 is stabilized (S403). After that, the LOAD signal is set to the high "H" level and the input data of the P/S conversion unit is decided (S404).

Subsequently, transmission data 0000(hex) is set (S405) so as to turn off the current supply of the sensor B group 209 and 32 clocks clk are generated from the clock signal SCLK↓, thereby transmitting and receiving the data of 32 bits (S406). Thus, the status of the sensor A group can be received. At this time, although the information of the sensor B group is also received in association with it, since the power supply is OFF, control is made so as to invalidate the data.

Explanation will be made in detail. The transmission data 0000(hex) is transmitted to the S/P conversion unit Q303 via SDATA_C2D and the data of R-IN31 to R-IN0 is received by the P/S conversion unit Q302 via SDATA_D2C. The data R-IN5 to R-IN16 and R-IN19 to R-IN31 received at this time is the invalid data. When the paper feed unit is not connected, upper 16 bits of the transmission/reception data is invalid data.

Subsequently, the LOAD signal is set to the L level (S407). After the apparatus waits for 100 μsec (S408), the LOAD signal is set to the H level and the output data of the S/P conversion unit Q303 is decided (S409). The next transmission data as data in the register for checking a change in status is cleared to 0 and initialized (S410). Step S410 is a processing step for clearing a communication buffer.

Subsequently, the received status of the sensor A group is compared with the obtained latest status.

When the door open/closure detecting switch (SW501) corresponding to bit 0 (R-IN0) of the reception data is open (S412), bit 0 of the next transmission data is set ("is set" written here denotes that the bit is set from 0 to 1), thereby allowing a detection result of the cartridge detecting sensor (Q607) to be outputted to the R-IN5 upon transmission of the next data (S413).

When the cassette open/closure detecting upper switch (SW502) corresponding to bit 1 (R-IN1) of the reception data changes from the open state to the closing state (S414), bit 1 of the next transmission data is set, thereby allowing detection results of the upper cassette size 0 sensor (Q608), upper cassette size 1 sensor (Q609), upper cassette size 2 sensor (Q610), and upper paper presence/absence sensor (Q611) to be outputted to R-IN6 to R-IN9 upon transmission of the next data (S415).

When the cassette open/closure detecting lower switch (SW503) corresponding to bit 2 (R-IN2) of the reception data changes from the open state to the closing state (S416), bit 2 of the next transmission data is set, thereby allowing detection results of the lower cassette size 0 sensor (Q612), lower cassette size 1 sensor (Q613), lower cassette size 2 sensor (Q614), and lower paper presence/absence sensor (Q615) to be outputted to R-IN10 to R-IN13 upon transmission of the next data (S417).

If the paper feed option connection detecting switch (SW505) corresponding to bit 4 (R-IN4) of the reception data indicates the presence of the connection (S418), a change in cassette open/closure state of the option cassette in step S419 and subsequent steps is discriminated. If the absence of the connection is detected, processes in step S423 and subsequent steps are executed.

If the option cassette open/closure detecting upper sensor corresponding to bit 17 (R-IN17) of the reception data changes from the open state to the closing state (S419), bit 17 of the next transmission data is set, thereby allowing detection results of the option upper cassette size 0 sensor, option upper cassette size 1 sensor, option upper cassette size 2 sensor, and option upper paper presence/absence detecting sensor to be outputted to R-IN22 to R-IN25 upon transmission of the next data (S420).

If the option cassette open/closure detecting lower sensor corresponding to bit 18 (R-IN18) of the reception data changes from the open state to the closing state (S421), bit 18 of the next transmission data is set, thereby allowing detection results of the option lower cassette size 0 sensor, option lower cassette size 1 sensor, option lower cassette size 2 sensor, and option lower paper presence/absence detecting sensor to be outputted to R-IN26 to R-IN29 upon transmission of the next data (S422).

The case where the next transmission data is equal to 0 (S423) corresponds to the case where it is unnecessary to detect the statuses of the sensor B group. Only the data of the sensor A group in which there is a change is updated, P5VC is turned off (S424), and the obtaining and discriminating processes of the statuses are finished. By the process in step S424, after completion of the status update, control for saving the power source necessary for updating the statuses is realized, and the electric power consumption can be further reduced.

The case where the next transmission data is equal to a value other than 0 (S423) corresponds to the case where it is necessary to detect the statuses of the sensor B group. Secondary obtaining and discriminating processes of the statuses in step S425 and subsequent steps are executed. As mentioned above, by the discriminating process in step S423, if the opening of the door is detected or if there is a change in open/closure of the cassette in step S412, the data of the sensor B group is collected in an interlocking relational manner. Therefore, the status data can be efficiently collected. On the contrary, when a possibility that the data of the sensor B group is unnecessary is high, the further large electric power saving can be realized without performing the status collection based on the sensor B group.

First, the data of 32 bits of the next transmission data mentioned above is transmitted (S425) by generating 32 clocks clk from the clock signal SCLK↓ (at this time, since the received data is the invalid data, it is abandoned). Subsequently, the LOAD signal is set to the L level (S426). After the apparatus waits for 100 μsec (S427), the LOAD signal is set to the H level (S428). By this operation, the output data of the S/P conversion unit is decided and the statuses of the sensor B group are decided as input data of the P/S conversion unit. By receiving the data of 32 bits (S429) by again generating 32 clocks clk from the clock signal SCLK↓, the statuses of the sensor B group are obtained.

At this time, the transmitted data is the invalid data because the on/off control of the LOAD signal is not made.

Subsequently, only the valid data in the received data is updated (S430), processes in step S424 and subsequent steps are executed, and the obtaining and discriminating processes of the statuses are finished.

The valid data denotes bit 5 of the reception data if bit 0 of the data transmitted in step S429 is equal to 1. It denotes bit 6 to bit 9 of the reception data if bit 1 of the transmitted data is equal to 1. It denotes bit 10 to bit 13 if bit 2 of the transmitted data is equal to 1. It denotes bit 22 to bit 25 of the reception data if bit 17 of the transmitted data is equal to 1. It is bit 26 to bit 29 of the reception data if bit 18 of the transmitted data is equal to 1. In the other cases, all of the data is the invalid data.

Although the obtaining and discriminating operations of the statuses from the DCON and the paper feed unit have been described in the above flowcharts, the apparatus also has a function for obtaining and discriminating the statuses of the sensor D group (217) and the sensor E group (218) by a similar method for the RCON. When the obtaining and discriminating operations of the statuses are executed from the DCON and the paper feed unit, the status obtaining and discriminating operations from the RCON are also simultaneously executed.

As mentioned above, according to the flowcharts of FIGS. 13 and 14, the current can be always supplied to P5VA which is necessary for detection or the like of a predetermined signal from the outside including the sub-CPU and the apparatus can be shifted to a state where P5VB necessary for executing the image creation (the units 212 regarding the laser, and the like) and the paper feed driving (the paper feed option 214, etc.) has been saved.

Second Embodiment

The first embodiment has been described on the assumption that the sub-CPU (1-chip microcomputer Q702) and the main chip Q701 are physically separately provided as shown in FIG. 7. However, the invention is not limited to it but there is also presumed a case where a mode for making a predetermined chip (CPU) operative by a high frequency clock and a mode for making it operative by a low frequency clock are made to correspond to the main chip and the sub-chip, respectively, or a case where a local power source in the predetermined chip is saved and the mode for making the chip operative by small electric power consumption is made to correspond to the sub-chip.

A construction of data processing programs which can be read out by the image forming apparatus according to the invention will be described hereinbelow with reference to a memory map shown in FIG. 15.

Figure 15:
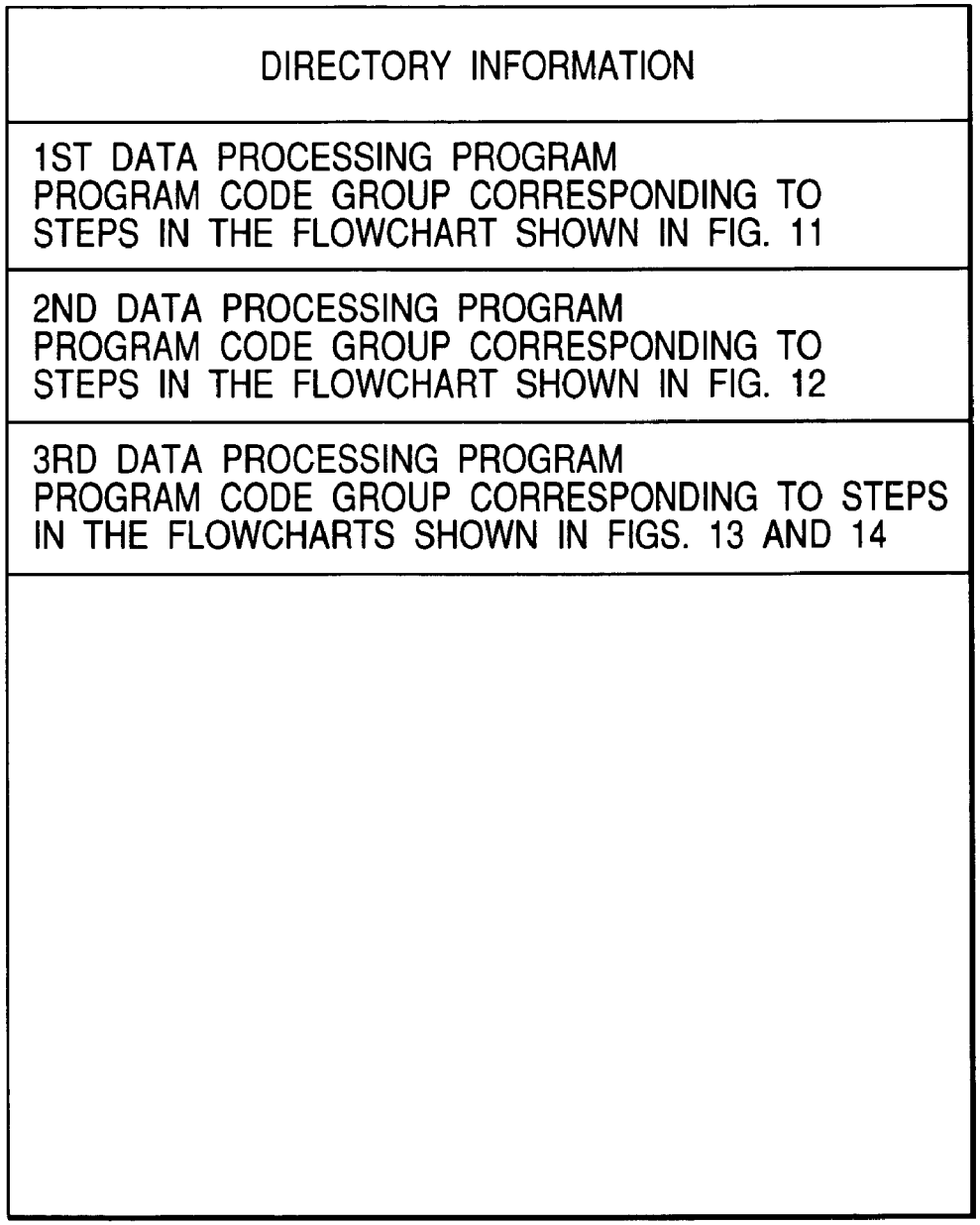
FIG. 15 is a diagram for explaining a memory map of a memory medium for storing various data processing programs which can be read out by the image forming apparatus according to the invention.
Figure 16:
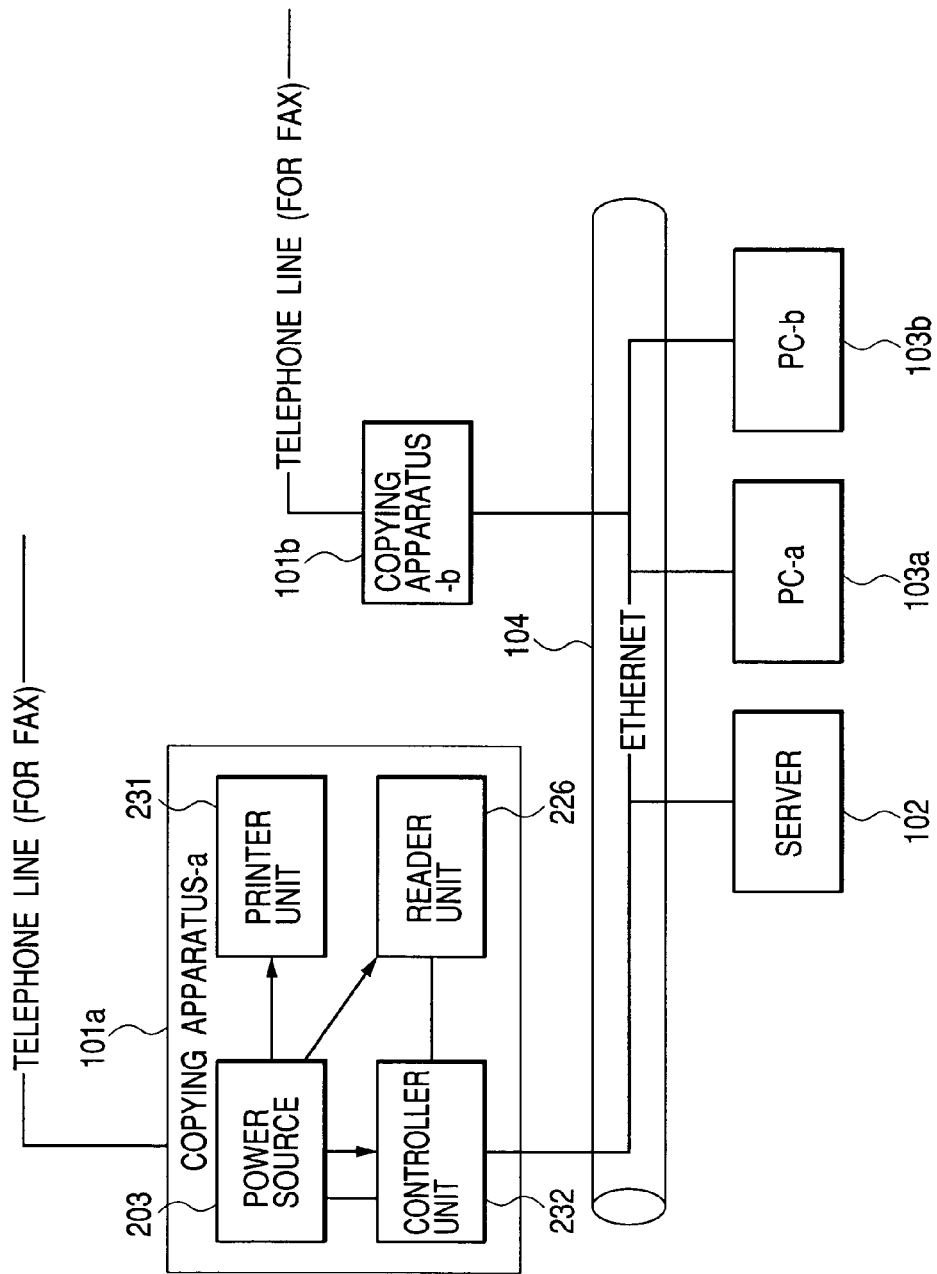
FIG. 16 is a block diagram showing an example of a conventional network system including an image forming apparatus.

FIG. 15 is a diagram for explaining the memory map in a memory medium for storing various data processing programs which can be read out by the image forming apparatus according to the invention.

Although not shown particularly in the diagrams, there can be a case where information for managing the program group which is stored in the memory medium, for example, version information, implementors, and the like are also stored and information depending on the OS or the like on the program reading side, for example, icons or the like for identifying and displaying the programs are also stored.

Further, data depending on the various programs has also been managed in the directories mentioned above. There is also a case where a program to install various programs into a computer or a case where if the program to be installed has been compressed, a program for decompressing the compressed program and the like are stored.

The functions shown in FIGS. 11 to 14 in the embodiments can be executed by a host computer in accordance with the program which is installed from the outside. In such a case, the invention is also applied to a case where an information group including the program is supplied to an output apparatus by a memory medium such as CD-ROM, flash memory, FD, or the like or from an external memory medium via the network.

As mentioned above, naturally, the objects of the invention are also accomplished by a method whereby a memory medium in which program codes of software for realizing the functions of the embodiments mentioned above have been recorded is supplied to a system or an apparatus and a computer (or a CPU or an MPU) of the system or the apparatus reads out the program codes stored in the memory medium and executes them.

In this case, the program codes themselves read out from the memory medium realize the novel functions of the invention and the memory medium in which the program codes have been stored constructs the invention.

As a memory medium for supplying the program codes, for example, it is possible to use a flexible disk, a hard disk, an optical disk, a magnetooptic disk, a CD-ROM, a CD-R, a magnetic tape, a non-volatile memory card, a ROM, an EEPROM, or the like.

Naturally, the invention incorporates not only a case where a computer executes the read-out program codes, so that the functions of the embodiments mentioned above are realized, but also a case where an OS (Operating System) or the like which is operating on the computer executes a part or all of actual processes on the basis of instructions of the program codes and the functions of the embodiments mentioned above are realized by those processes.

Further, naturally, the invention incorporates a case where the program codes read out from the memory medium are written into a memory provided for a function expanding board inserted into a computer or a function expanding unit connected to a computer and, thereafter, a CPU or the like provided for the function expanding board or the function expanding unit executes a part or all of actual processes on the basis of instructions of the program codes and the functions of the embodiments mentioned above are realized by those processes.

According to the embodiments mentioned above, even if the digital hybrid apparatus is in the sleep mode, in the case of making a response of the status inquired by the network, it can be responded by extremely small energy and at low costs.

In the power saving mode, the sub-chip meets the status request from the network in place of the main chip whose electric power consumption is large, thereby enabling the reduction of the electric power consumption to be realized.

Further, in the power saving mode, the main chip is set to the sleep mode, its operation is stopped, and the sub-chip recognizes its status and meets the status request, thereby enabling the further small electric power consumption to be accomplished.

Moreover, when the status is updated in the image forming apparatus in the power saving mode, the sensor groups are classified into a plurality of types, the power source is supplied only to the sensors of the necessary group (type), and the status of the image forming apparatus is periodically updated. Therefore, the further large power saving can be accomplished while keeping the contents which are notified to the external host computer so as to be similar to the contents which are obtained in the case where the power source is supplied to the sensors to which the power supply is unnecessary.

Since the status is periodically updated in the image forming apparatus under the non-wasteful power control as mentioned above, the user who operates the external host computer can obtain the latest status of the image forming apparatus or the status near it without particularly being aware of anything by the operation similar to that in the case where the image forming apparatus is operating, especially, without executing any surplus operations.

If the command of the print request or the like is received in the power saving mode and it is necessary to return the digital hybrid apparatus to the normal mode, the sub-chip discriminates it, activates the main chip, and transfers the command information such as a print request or the like received by the sub-chip to the main chip, thereby realizing the low electric power consumption while making a command response on the network without interruption.

The invention is not limited to the foregoing embodiments but many various modifications are possible on the basis of the spirit of the invention and they are not excluded from the purview of the invention.

As described above, according to the invention, in the image forming apparatus which can be connected to the network via the network connecting means, the further larger electric power saving than the conventional one is realized and a response of the updated status can be made to the status request from the external apparatus.

In the image forming apparatus having a plurality of various sensors, the status response to the external apparatus can be made to the sub-CPU whose electric power consumption is smaller than that of the main chip.

What is claimed is:

1. An image forming apparatus comprising:
    a communication unit adapted to make communication with an external apparatus;
    a detection unit adapted to detect a status of said image forming apparatus, said detection unit comprising first and second detectors;
    a first control unit adapted to process an image to be supplied to an interface for transmission of an image signal;
    a second control unit adapted to control power supply to said detection unit, if the status of said image forming apparatus is to be detected in a power saving mode, said second control unit operating with power supply lower than that of said first control unit,
    wherein power supply to said detection unit and to said first control unit is saved when said image forming apparatus is in the power saving mode,
    wherein said communication unit informs the external apparatus of the status of said image forming apparatus detected by said detection unit with the power supply controlled by said second control unit in response to inquiry about the status of said image forming apparatus from the external apparatus received in the power saving mode, and
    wherein in the power saving mode, said second control unit executes power supply to said first detector to obtain a detection result, and switches between (a) executing power supply to said second detector to enable said second detector to detect the status of said image forming apparatus and (b) stopping power supply to said first detector without enabling said second detector to detect the status of said image forming apparatus, in response to the detection result obtained by said first detector.

2. An image forming apparatus according to claim 1, further comprising a switching unit adapted to connect said first control unit to said communication unit in a normal operating mode and said second control unit to said communication unit in the power saving mode, for output of the status of said image forming apparatus detected by said detection unit.

3. An image forming apparatus according to claim 1, further comprising a switching unit adapted to connect said first control unit to said communication unit in a normal operating mode and said second control unit to said communication unit in the power saving mode, for communication of information.

4. A power control method carried out in an image forming apparatus which comprises a communication unit for making communication with an external apparatus and a detection unit comprising first and second detectors for detecting a status of the image forming apparatus, said method comprising:
    a first control step of processing an image to be supplied to an interface for transmission of an image signal using a first control unit;
    a second control step of controlling power supply to the detection unit using a second control unit, if the status of said image forming apparatus is to be detected in a power saving mode, the second control unit operating with power supply lower than that of the first control unit; and
    a communication step of informing the external apparatus of the status of the image forming apparatus detected by the detection unit with the power supply controlled in said second control step in response to inquiry about the status of the image forming apparatus from the external apparatus received in the power saving mode,
    wherein power supply to the detection unit and to the first control unit is saved when said image forming apparatus is in the power saving mode, and
    wherein in the power saving mode, said second control step executes power supply to the first detector to obtain a detection result, and switches between (a) executing power supply to the second detector to enable the second detector to detect the status of the image forming apparatus and (b) stopping power supply to the first detector without enabling the second detector to detect the status of the image forming apparatus, in response to the detection result obtained by the first detector.

5. A method according to claim 4, further comprising a switching step of connecting the first control unit to the communication unit in a normal operating mode and the second control unit to the communication unit in the power saving mode, for output of the status of the image forming apparatus detected by the detection unit.

6. A method according to claim 4, further comprising a switching step of connecting the first control unit to the communication unit in a normal operating mode and the second control unit to the communication unit in the power saving mode, for communication of information.

7. A computer-readable storage medium storing a program for carrying out a power control method in an image forming apparatus which comprises a communication unit for making communication with an external apparatus and a detection unit comprising first and second detectors for detecting a status of the image forming apparatus, said program comprising:
    a first control step of processing an image to be supplied to an interface for transmission of an image signal using a first control unit;
    a second control step of controlling power supply to the detection unit using a second control unit, if the status of said image forming apparatus is to be detected in a power saving mode, the second control unit operating with power supply lower than that of the first control unit; and
    a communication step of informing the external apparatus of the status of the image forming apparatus detected by the detection unit with the power supply controlled in said second control step in response to inquiry about the status of the image forming apparatus from the external apparatus received in the power saving mode,
    wherein power supply to the detection unit and to the first control unit is saved when said image forming apparatus is in the power saving mode, and wherein in the power saving mode, said second control step executes power supply to the first detector to obtain a detection result, and switches between (a) executing power supply to the second detector to enable the second detector to detect the status of the image forming apparatus and (b) stopping power supply to the first detector without enabling the second detector to detect the status of the image forming apparatus, in response to the detection result obtained by the first detector.

8. A program according to claim 7, further comprising a switching step of connecting the first control unit to the communication unit in a normal operating mode and the second control unit to the communication unit in the power saving mode, for output of the status of the image forming apparatus detected by the detection unit.

9. A program according to claim 7, further comprising a switching step of connecting the first control unit to the communication unit in a normal operating mode and the second control unit to the communication unit in the power saving mode, for communication of information.

* * * * *